United States Patent
Kawanishi et al.

(10) Patent No.: US 8,682,177 B2
(45) Date of Patent: Mar. 25, 2014

(54) SUPER HIGH SPEED OPTICAL FREQUENCY SWEEPING TECHNOLOGY

(75) Inventors: Tetsuya Kawanishi, Koganei (JP);
Takahide Sakamoto, Koganei (JP);
Masahiro Tsuchiya, Koganei (JP)

(73) Assignee: National Institute of Information and Communications Technology, Tokyo (JP)

(*) Notice: Subject to any disclaimer, the term of this patent is extended or adjusted under 35 U.S.C. 154(b) by 961 days.

(21) Appl. No.: 12/306,117

(22) PCT Filed: Jun. 23, 2006

(86) PCT No.: PCT/JP2006/313036
§ 371 (c)(1),
(2), (4) Date: Jan. 16, 2009

(87) PCT Pub. No.: WO2007/148413
PCT Pub. Date: Dec. 27, 2007

(65) Prior Publication Data
US 2009/0304393 A1    Dec. 10, 2009

(51) Int. Cl.
*H04B 10/04* (2011.01)
(52) U.S. Cl.
USPC .......................... 398/187; 398/188; 398/183
(58) Field of Classification Search
USPC ........................................ 398/183, 188, 187
See application file for complete search history.

(56) References Cited

U.S. PATENT DOCUMENTS

| 6,591,026 B2* | 7/2003 | Endo et al. ................ 385/15 |
| 2001/0008569 A1 | 7/2001 | Rangary |
| 2002/0024411 A1 | 2/2002 | Uchino |
| 2002/0048076 A1 | 4/2002 | Kondo et al. |
| 2002/0075045 A1 | 6/2002 | Kawauchi |
| 2002/0126932 A1 | 9/2002 | Minakata et al. |
| 2002/0181073 A1 | 12/2002 | Kawanishi |
| 2004/0085620 A1 | 5/2004 | Kawanishi et al. |
| 2004/0100682 A1 | 5/2004 | Fujiwara et al. |
| 2005/0180761 A1* | 8/2005 | Kawanishi et al. ........... 398/187 |
| 2006/0261903 A1 | 11/2006 | Watanabe et al. |

FOREIGN PATENT DOCUMENTS

| JP | 03-136178 | 6/1991 |
| JP | 05-133840 | 5/1993 |
| JP | 06-006137 | 1/1994 |
| JP | 10-133159 A | 5/1998 |

(Continued)

OTHER PUBLICATIONS

International Preliminary Report on Patentability issued Feb. 12, 2009, in International Patent Application No. PCT/JP2006/313036 (11 pages).

(Continued)

Primary Examiner — Kinam Park
(74) Attorney, Agent, or Firm — Osha Liang LLP

(57) ABSTRACT

It is an object to provide an optical frequency control device or the like which can quickly carry out control over a wide frequency range. The object is achieved by an optical frequency control device or the like comprised of an optical SSB modulator (2), a bias voltage source (3) for applying a bias voltage to the optical SSB modulator (2), and a modulating signal source (4) for applying a modulating signal to the optical SSB modulator (2), wherein the modulating signal source (4) is provided with an arbitrary waveform generator (5) for generating an electrical signal with an arbitrary waveform, and an electrical signal multiplier (6) for multiplying a frequency of the electrical signal generated by the arbitrary waveform generator (5).

26 Claims, 19 Drawing Sheets

(56) References Cited

FOREIGN PATENT DOCUMENTS

| JP | 11-295674 | 10/1999 |
| JP | 2000-047159 | 2/2000 |
| JP | 2000-267056 | 9/2000 |
| JP | 2001-077794 | 3/2001 |
| JP | 2001-156548 | 6/2001 |
| JP | 2001-264714 | 9/2001 |
| JP | 2002-40381 A | 2/2002 |
| JP | 2002-064335 | 2/2002 |
| JP | 2002-169133 A | 6/2002 |
| JP | 2002-268025 | 9/2002 |
| JP | 2002-277916 A | 9/2002 |
| JP | 2002-341299 | 11/2002 |
| JP | 2004-85602 | 3/2004 |
| JP | 2004-245750 A | 9/2004 |
| JP | 2004-310138 | 11/2004 |
| JP | 2005-167317 | 6/2005 |
| JP | 2005-244655 | 9/2005 |
| JP | 2005-345642 | 12/2005 |
| JP | 2005-353769 | 12/2005 |
| JP | 2006-011838 | 1/2006 |

OTHER PUBLICATIONS esp@cenet Abstract of Japan Publication No. JP-2005-167317, published Jun. 23, 2005 (1 page).
Patent Abstracts of Japan Abstract for Japan Publication No. 2002-268025, published Sep. 18, 2002 (1 page).
Patent Abstracts of Japan for Japan Publication No. 2000-267056, published Sep. 29, 2000 (2 pages).
esp@cenet Abstract of Japan Publication No. JP-2002-169133 (A), published Jun. 14, 2002 (1 page).
esp@cenet Abstract of Japan Publication No. JP-11295674 (A), published Oct. 29, 1999 (1 page).
Patent Abstracts of Japan Abstract for Japan Publication JP-2006-011838, published Jan. 12, 2006 (1 page).
Patent Abstracts of Japan Abstract for Japan Publication No. JP-2005-353769, published Dec. 22, 2005 (1 page).
esp@cenet Abstract for Japan Publication No. JP-2004-310138 (A), published Nov. 4, 2004 (1 page).
Patent Abstracts of Japan Abstract for Japan Publication No. JP-2004-245750, published Sep. 2, 2004 (1 page).
Patent Abstracts of Japan Abstract for Japan Publication No. JP-2002-341299, published Nov. 27, 2002 (1 page).
esp@cenet Abstract of JP-2002-277916 (A), published Sep. 25, 2002 (1 page).
Patent Abstracts of Japan Abstract for Japan Publication No. JP-05-133840, published May 28, 1993 (1 page).
Tetsuya Kawanishi, et al., "Resonant-type optical modulator with planar structures"; The Institute of Electronics, Information and Communication Engineers (IEICE), Technical Report of IEICE, LOE2001-3 (May 2005); pp. 13-18.
Tetsuya Kawanishi, et al., "Optical filter characterization by using optical frequency sweep technique with a single sideband modulator"; IEICE Electronics Express, vol .3, No. 3; pp. 34-38.
Shimotsu Shinichi, et al., "LiNb03 optical SSB modulator for next-generation communication"; Optical Alliance, 2000.7; pp. 27-30.
Tetsuya Kawanishi, et al., "Optical frequency shifter with SSB modulator"; Technical Report of IEICE, OCS2002-49, PS2002-33, OFT2002-30 (Aug. 2002); pp. 69-74.
K. Higuma, et al., "X-cut lithium niobate optical single-sidebandmodulator"; Electron Letter, vol. 37 (2001); pp. 515-516.
"Optical Integrated Circuits"; Ohmsha ISBN4-274-12944-6; pp. 119-120, with English explanation "(c) Lumped circuit type and traveling-wave type", pp. 1-2.
Patent Abstracts of Japan Abstract for Japan Publication No. JP-06-006137, published Jan. 14, 1994 (1 page).
Patent Abstracts of Japan Abstract for Japan Publication No. JP-03-136178, published Jun. 10, 1991 (1 page).

* cited by examiner

Fig. 17
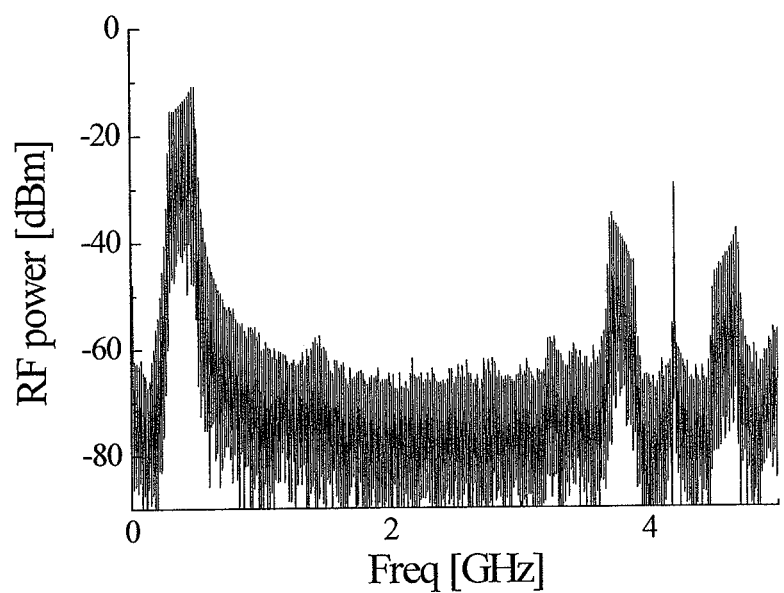
Fig. 18 (A)
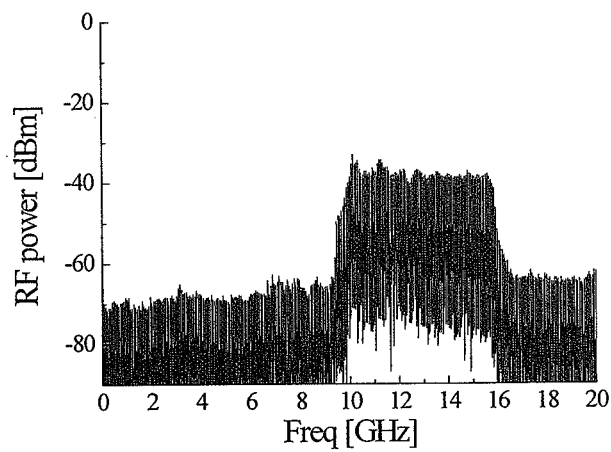
(B)
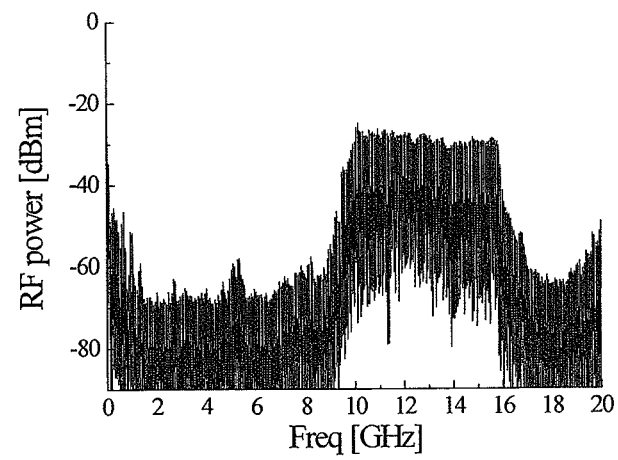

Fig. 19
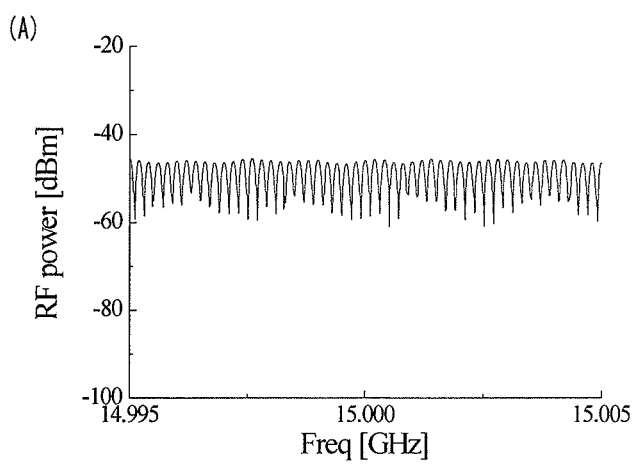
(A)
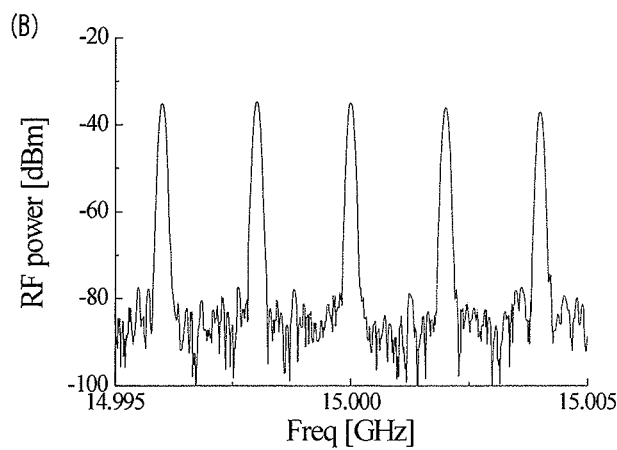
(B)
Fig. 20
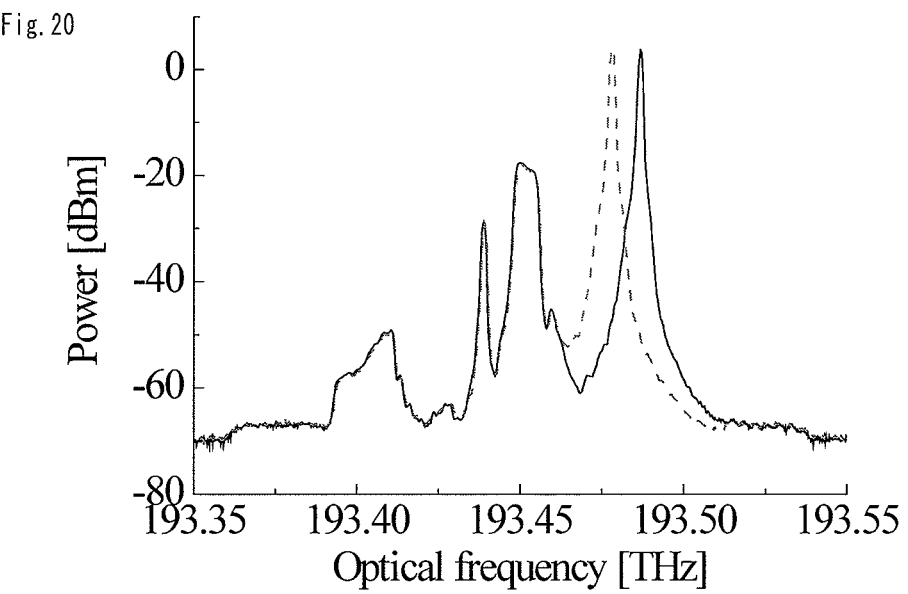

US 8,682,177 B2

SUPER HIGH SPEED OPTICAL FREQUENCY SWEEPING TECHNOLOGY

TECHNICAL FIELD

The present invention generally relates to the optical frequency control device which has the modulation signal source which comprises an arbitrary waveform generator and an electrical signal frequency reciprocation device so that the modulation signal added to an SSB modulator be ultra high speed and wide range.

BACKGROUND ART

As an optical frequency control device, the optical single-side-band (SSB) modulator has already known in the art. An optical SSB modulator is the optical modulator which can obtain the output light shifted by the frequency of a modulation signal (S. Shimotsu, S. Oikawa, T. Saitou, N. Mitsugi, K. Kubodera, T. Kawanishi and M. Izutsu, "Single Side-Band Modulation Performance of a LiNbO$_3$ Integrated Modulator Consisting of Four-Phase Modulator Wavegate," Institute of Electrical and Electronics Engineers Photon. Tech. Lett., Vol. 13, and 364-366 Reference (2001) (non-patent document 1 and 2).

The frequency control technology using an optical SSB modulator has a feature that using the technology precision becomes relatively high and stability becomes excellent. However, the speed for sweeping the optical frequency using an optical SSB modulator is restricted by the sweep speed of the modulation signal which is electrical signal. For example, when the electrical signal frequency sweep unit with a wide frequency range was used, the sweep rate was limited. On the other hand, although the FM modulator can carry out the sweep of the frequency at comparatively high speed, its frequency transition width was as narrow as several 100 MHz or less. Therefore, since the signal control which has a high sweep rate and a large frequency range could not be attained, the frequency control technology of an optical SSB modulator also had the problem that it was incompatible in them.

Reference Literature

Non Patent Document 1:
S. Shimotsu, S. Oikawa, T. Saitou, N. Mitsugi, K. Kubodera, T. Kawanishi and M. Izutsu, "Single Side-Band Modulation Performance of a LiNbO3 Integrated Modulator Consisting of Four-Phase Modulator Wavegate," IEEE Photon. Tech. Lett., Vol. 13, 364-366 (2001)

Non Patent Document 2:
T. Kawanishi, T. Sakamoto and M. Izutsu, Optical filter characterization by using optical frequency sweep technique with a single sideband modulator, IEICE Electron. Express, 3, 34-38 (2006)

DISCLOSURE OF INVENTION

An object of the present invention is to provide a control device of an optical frequency which can control optical frequency with vast frequency range quickly.

Another object of the present invention is to provide the optical frequency control signal generator, the precision measuring instruments and apparatus of an optical filter, a measuring instrument and apparatus, a radio-signal generator, etc. using the above control devices The speed which carries out the sweep of the optical frequency using an optical SSB modulator is restricted by the sweep rate of the modulation signal which is an electrical signal. Fundamentally, the present invention uses the of a modulation signal source which combines the arbitrary waveform generator and the electrical signal frequency multiplier. Thereby, the present invention can obtain the modulation electrical signal covering a vast frequency range with high speed.

As a result, the present invention can also control the wavelength for an optical SSB modulation which covers large frequency range with high speed.

That is, the arbitrary waveform generator can generate the electrical signal by which the frequency sweep was carried out at high speed. However, the frequency band which an arbitrary waveform generator can generate is as narrow as 500 MHz or less. The span of a frequency transition is expanded with an electrical signal frequency multiplier by the electrical signal which made it generate in an arbitrary waveform generate equipment. After obtaining the modulation signal with a high speed and a large frequency range, and an optical SSB modulator is driven using such a modulation signal.

Thereby, the frequency sweep of a high speed and a large frequency range becomes possible.

An Explanation of the Drawings:

FIGS. 11A, 11B, 11C, and 11D are figures showing the data for the calibrations when making frequency sweep speed into a microsecond for 0.5 microsecond, 5 microseconds, 50 microseconds, or 500 microseconds, respectively.

FIGS. 12A, 12B, and 12C are 95%, 90%, and 85%, respectively.

FIGS. 13A, 13B, 13C, and 13D show that whose frequency sweep speed is 500 microseconds, 50 microseconds, 5 microseconds, and 0.5 microsecond, respectively.

FIGS. 14A, 14B, 14C, and 14D show that whose frequency sweep speed is 500 microseconds, 50 microseconds, 5 microseconds, and 0.5 microsecond, respectively.

FIG. 17 is the graph replaced with figure in which the output signal of an arbitrary waveform generator (AWG) is shown.

FIG. 18 is the graph replaced with figure in which the modulation signal impressed to an optical SSB modulator is shown. FIG. 18A and FIG. 18B show the input signal to the output of a multiplying device, and the input signal for the $RF_A$ port of a modulator, respectively.

FIG. 19 is the graph replaced with figure in which the input signal to an optical SSB modulator is shown. In FIG. 19A and FIG. 19B, a sweep rate shows the thing for 5 microseconds and 0.5 microsecond, respectively.

FIG. 20 is the graph replaced with figure which shows the optical spectrum at which the light source 2 was put to the short wavelength side.

BEST MODE FOR CARRYING OUT THE INVENTION

1. Optical-Frequency Control Device.

Figure 1:
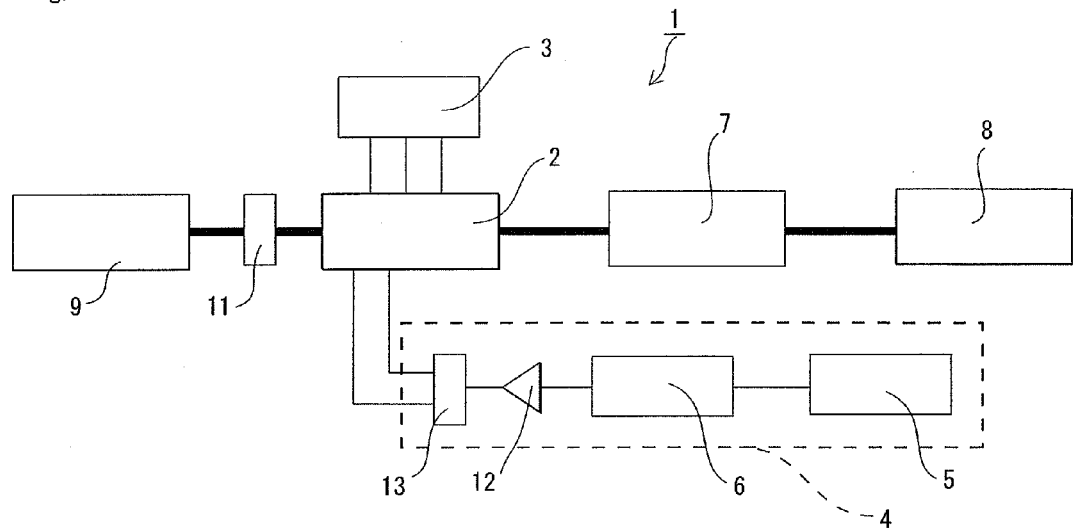
FIG. 1 is a block diagram showing the basic setup of the present invention.

Hereafter, a device and a method of the present invention is explained with reference too drawings. FIG. 1 is a block diagram showing the basic setup of the present invention.

As shown in the FIG. 1, the optical frequency control device of the present invention basically comprises:
an optical SSB modulator (2);
a source of bias voltage (3) which applies bias voltage to the optical SSB modulator (2);
a source of a modulation signal (4) which applies modulation signals to the optical SSB modulator (2),
wherein, the source of a modulation signal (4) comprises:
an arbitrary waveform generator (5) for generating the electrical signal which has arbitrary waveforms; and
an electrical-signal frequency multiplier (6) for multiplying the frequency of the electrical signal generated by the arbitrary waveform generator (5). The modulation signal to the optical SSB modulator (2) is generated by using the electrical signal, the electrical signal being generated by the arbitrary waveform generator (5) and being multiplied by the electrical signal frequency multiplier (6). In the figure, element numeral 7 indicates an object to be measured, 8 shows an optical light detector, 9 shows a light source, 11 shows a polarization controller, 12 shows an amplifier, and 13 shows a coupler. Hereafter, each member which constitutes the present invention is explained.

Optical Frequency Control Device (1)

That an optical-frequency control device (1) carries out the sweep of the optical frequency, and outputs it etc. is a unit which can control the frequency of the light to output.

Optical SSB Modulator (2)

An optical SSB modulator (2) means an optical signal side-band modulator. The optical SSB modulator (2) is an optical modulator which can obtain an output light having shifted for a frequency ($f_m$) of a modulating signal (e.g. as described in [S. Shimotsu, S. Oikawa, T. Saitou, N. Mitsugi, K. Kubodera, T. Kawanishi and M. Izutsu, "Single Side-Band Modulation Performance of a LiNbO3 Integrated Modulator Consisting of Four-Phase Modulator Waveguide," IEEE Photon. Tech. Lett., Vol. 13, 364-366 (2001)] and [Shimotsu Shinichi, Masayuki Izutsu, "LiNbO3 optical SSB modulator for next-generation communication", Optical Alliance, 2000.7. pp. 27-30]).

It is to be noted that the operation of an conventional optical SSB modulator is described in detail in for example, [Tetsuya Kawanishi, Masayuki Izutsu, "Optical frequency shifter using optical SSB modulator", TECHNICAL REPORT OF IEICE, OCS2002-49, PS2002-33, OFT2002-30 (2002-08)] and [Higuma et al., "X-cut lithium niobium optical SSB modulator, Electron Letter, vol. 37, 515-516 (2001)].

Figure 2:
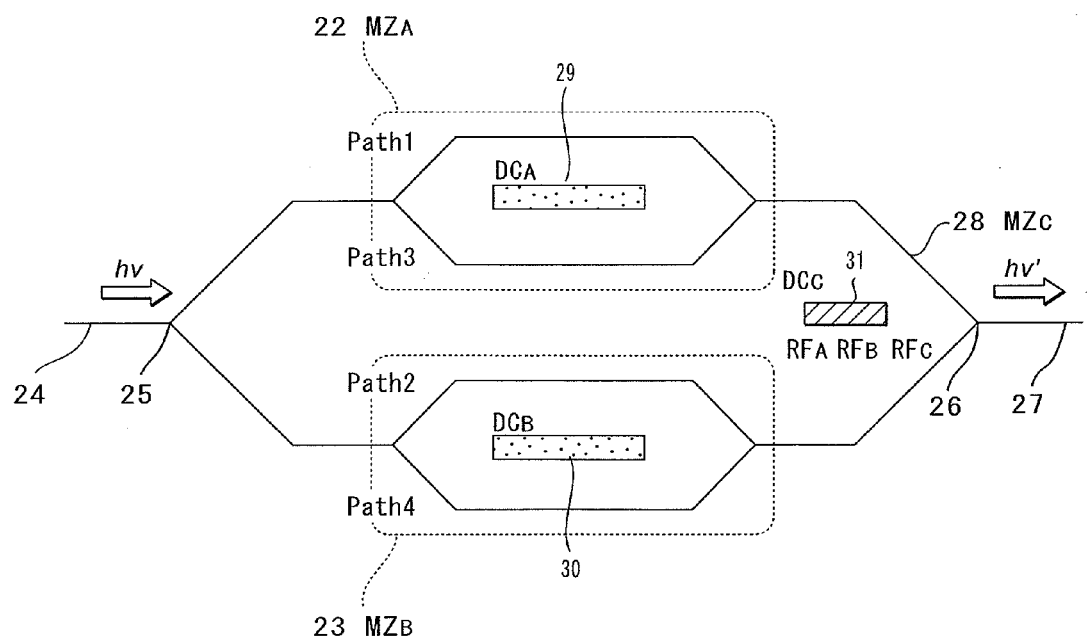
FIG. 2 is a schematic diagram showing the example of an optical SSB modulator.

As an optical SSB modulator (2), a well known optical SSB modulator may be used. As an optical SSB modulator (2), what is shown in FIG. 2 may, for example, be used. FIG. 2 is a schematic diagram showing the example of an optical SSB modulator. The optical SSB modulator shown in FIG. 2 has a 1st Sub Mach-Zehnder waveguide ($MZ_A$) (22); a 2nd Sub Mach-Zehnder waveguide ($MZ_B$) (23); a main Mach-Zehnder wave guide (28) ($MZ_C$); and a 1st electrode ($RF_A$ electrode) (29); a 2nd electrode ($RF_B$ electrode) (30); and a main Mach-Zehnder electrode (electrode C) (31).

The 1st Sub Mach-Zehnder waveguide ($MZ_A$) of the above contains the input unit (24) and multipoint part (25) of an optical signal. At the multipoint part (25), input light branches to $MZ_A$ and $MZ_B$.

The main Mach-Zehnder wave guide ($MZ_C$) (28) contains $MZ_B$, $MZ_A$, a coupling part (26), and the output unit (27). At the coupling part (26), the optical signal outputted from $MZ_A$ and $MZ_B$ is coupled.

From the output unit (27), the optical signal coupled at the coupling part is outputted. The 1st electrode ($RF_A$ electrode) (29) is an electrode for inputting a radio frequency (RF) signal into two arms which constitute $MZ_A$. The 2nd electrode ($RF_B$ electrode) (30) is an electrode for inputting a radio-frequency (RF) signal into two arms which constitute $MZ_B$. The main Mach-Zehnder electrode (electrode C) (31) is an electrode for impressing a voltage to $MZ_C$, in order to control the phase difference of the output signal from $MZ_A$, and the output signal from $MZ_B$. In addition, a main Mach-Zehnder electrode may function as a $DC_C$ electrode in which a bias electrode is impressed.

Each Mach-Zehnder waveguide, for example, is provided with a waveguide of nearly hexagonal shape (which composes two arms of the MZ), and is provided with two parallel aligned phase modulators. A phase modulator for example can be realized by an electrode which is parallel aligned with waveguides. An intensity modulator for example can be realized by a MZ waveguide and an electrode applying electric field to the both arms of the MZ waveguide.

A Mach-Zehnder waveguide or an electrode is generally provided on a substrate. The material of the substrate and each waveguide is not specifically limited if light can propagate therethrough. For example, a lithium niobate waveguide with a Ti diffusion may be formed on an LN substrate, and a silicon dioxide (SiO2) waveguide may be formed on a silicon (Si) substrate.

Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$: LN) and cut out in a direction orthogonal to the X-axis (X-cut), and light is propagated in a Z-axis direction (Z-axis propagation). This is because a lowpower-consumption drive and a superior response speed can be achieved due to dynamic electr-ooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3v}$, $C_3$, $D_3$, $C_{3h}$, and $D_{3h}$. These materials have a refractive index adjusting function in which a change in the refractive index due to the application of an electric field has a different sign depending on a mode of a propagation light.

As a specific example, lithium tantalite oxide ($LiTiO_3$: LT), $\beta$-$BaB_2O_4$ (abbr. BBO), $LiNbO_3$ and the like can be used other than lithium niobate. The dimension of the substrate is not particularly limited if it is large enough to be able to form a predefined waveguide. The width, length, and the depth of each waveguide is also not particularly limited if the module of the present invention is able to fulfill its function. The width of each waveguide can be, for example, around 1 micrometer to 20 micrometer, preferably about 5 micrometer to 10 micrometer. The depth (the thickness) of waveguide can be 1 micrometer to 20 micrometer, preferably 5 micrometer to 10 micrometer.

Apart from the above-mentioned $RF_A$ electrode and a $RF_B$ electrode, a bias compensation electrode may be putted on the Sub Mach-ehnder waveguide.

An above-mentioned $RF_A$ electrode and $RF_B$ electrode may function as bias compensation electrodes.

The first bias adjustment electrode ($DC_A$ electrode) is an electrode for controlling bias voltage between the two arms (path 1 and Path 3) composing the $MZ_A$ to control a phase of light propagating between the two arms of the $MZ_A$. On the other hand, the second bias adjustment electrode ($DC_B$ electrode) is an electrode for controlling bias voltage between the two arms (path 2 and path 4) composing the $MZ_B$ to control a phase of light propagating between the two arms of the $MZ_B$. The $DC_A$ electrode and the $DC_B$ electrode are preferably direct current electrodes or low frequency electrodes in general.

It is to be noted that "low frequency" of the low frequency electrode means frequency of, for example, 0 Hz to 500 MHz. A phase modulator for adjusting a phase of an electric signal is preferably provided at the output of the signal source of this low frequency signal in order to be able to control a phase of an output signal.

The first modulation electrode ($RF_A$ electrode) is an electrode for inputting a radio frequency (RF) signal to the two arms comprising the $MZ_A$. On the other hand, the second modulation electrode ($RF_B$ electrode) is an electrode for inputting radio frequency ($RF_A$ signal and $RF_B$ signal) signals to the two arms comprising the $MZ_B$. A traveling-wave-type electrode or a resonant-type electrode can be mentioned as the $RF_A$ electrode and the $RF_B$ electrode, and the resonant-type electrode is preferable.

As explained above, two other electrodes may serve as a $DC_A$ electrode and an $RF_A$ electrode separately, on the other hand, one electrode may act as those electrodes alone. In the latter case, a bias voltage and a radio frequency signal is applied to one electrode.

The $RF_A$ electrode and the $RF_B$ electrode are preferably connected to a high frequency signal source.

The high frequency signal source is a device for controlling a signal transmitted to the $RF_A$ electrode and the $RF_B$ electrode. As the high frequency signal source, a known high frequency signal source can be adopted. As frequencies ($f_m$) of the high frequency signal inputted to the $RF_A$ electrode and the $RF_B$ electrode, e.g. 1 GHz to 100 GHz can be mentioned. As an output of a high frequency signal source, a sinusoidal wave having a fixed frequency can be mentioned. A phase modulator is preferably provided at an output of this high frequency signal source in order to be able to control a phase of an output signal.

The $RF_A$ electrode and the $RF_B$ electrode are composed of e.g. gold, platinum or the like. As the width of the $RF_A$ electrode and the $RF_B$ electrode, 1 micrometer to 10 micrometer can be mentioned, and 5 micrometer can be specifically mentioned. As the length of the $RF_A$ electrode and the $RF_B$ electrode, 0.1 times to 0.9 times the wavelength (fm) of the modulation signal can be mentioned including 0.18 to 0.22 times or 0.67 to 0.70 times. And more preferably, it is shorter than the resonant point of the modulation signal by 20 to 25%. This is because with such a length, the synthesized impedance with a stub electrode remains in an appropriate region. As a more specific length of the $RF_A$ electrode and the $RF_B$ electrode, 3250 micro meter can be mentioned. Hereinafter, a resonant-type electrode and a traveling-wave-type electrode are described.

A resonant-type optical electrode (resonant type optical modulator) is an electrode for performing a modulation by using resonance of a modulation signal. A known resonant-type electrode such as those described in the Japanese Patent Application Laid-Open 2002-268025, and [Tetsuya Kawanishi, Satoshi Oikawa, Masayuki Izutsu, "Planar Structure Resonant-type Optical Modulator", TECHNICAL REPORT OF IEICE, LQE2001-3 (2001-05)] can be adopted as a resonant type electrode.

A traveling-wave-type electrode (traveling wave-type optical modulator) is an electrode (modulator) for modulating light while guiding waves so that a light wave and an electric signal are guided in the same direction (e.g. Hiroshi Nishihara, Masamitsu Haruna, Toshiaki Suhara, "Optical Integrated Circuit" (revised and updated edition), Ohmsha, pp. 119-120). A known traveling-wave-type electrode such as those described in Japan Patent Application Laid-Open Nos. 11-295674, 2002-169133, 2002-40381, 2000-267056, 2000-471159, and 10-133159, for example, can be adopted as a traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The RF electrode may act as both of the electrodes for the RF signal and the DC signal. Namely, either one of or both of the $RF_A$ electrode and the $RF_B$ electrode are connected to a feeder circuit (bias circuit) for supplying the DC signal and the RF signal mixed. Since the optical SSB modulator of this embodiment has the RF electrode connected to the feeder circuit (bias circuit), an RF signal (ratio frequency signal) and a DC signal (direct current signal: signal related to a bias voltage) can be inputted to the RF electrode.

It is to be noted that the preferable embodiment of the above system comprises as, the main Mach-Zehnder electrode (electrode C) (31), a first main Mach-Zehnder electrode ($MZ_{CA}$ electrode) and a second main Mach-Zehnder electrode ($MZ_{CB}$ electrode). The first main Mach-Zehnder electrode ($MZ_{CA}$ electrode) is provided along at least a part of a waveguide portion between an output part of the first intensity modulator and the combining part. The second main Mach-Zehnder electrode ($MZ_{CB}$ electrode) is provided along at least a part of a waveguide portion between an output part of the second intensity modulator and the combining part.

The optical modulation system of the above embodiment of the present invention comprises the first main Mach-Zehnder electrode ($MZ_{CA}$ electrode) and the second main Mach-Zehnder electrode ($MZ_{CB}$ electrode (15)). Since these electrodes are able to adjust phases of output signals from the sub Mach-Zehnder waveguides and the like provided on both arms of the Mach-Zehnder, optical phases of the output signals from the each sub Mach-Zehnder waveguides can be controlled. A carrier wave (a carrier signal) or a high order component (e.g. a second order component ($f_0 \pm 2f_m$)) of the optical signals to be combined is controlled so that the phases of the carrier wave or the high order component and the like are reversed, and then, the optical signals are combined, thereby suppressing these components. In order to suppress certain components this way, the following steps are preferably performed.

The first main Mach-Zehnder electrode ($MZ_{CA}$ electrode) is laid along at least a part of the waveguide between an output part of the first sub Mach-Zehnder waveguide ($MZ_A$) and the combining part. And, "at least a part" is a length long enough to be able to adjust phase of an output signal. As for the electrode, similar one that is used for the sub Mach-Zehnder waveguide may be used.

The second main Mach-Zehnder electrode ($MZ_{CB}$ electrode) is laid along at least a part of the waveguide between an output part of the second sub Mach-Zehnder waveguide ($MZ_B$) and the combining part, which is the same as the $MZ_{CA}$ electrode. It is to be noted that the first main Mach-Zehnder electrode ($MZ_{CA}$ electrode) and the second main Mach-Zehnder electrode ($MZ_{CB}$ electrode) may make the waveguide portions whereon each of the electrodes is provided act as an optical phase modulator.

The branching part (25) of the main MZ waveguide ($MZ_C$) is a part where optical signals branch into the first sub MZ waveguide ($MZ_A$) and the second sub MZ waveguide ($MZ_B$). The branching part (25) takes, for example, a Y-branching form. The combining part (26) is a part where optical signals outputted from the first sub MZ waveguide ($MZ_A$) and the second sub MZ waveguide ($MZ_B$) are combined. The combining part (26) takes, for example, a Y-branching form. The above Y-branching formed parts may be symmetry or asymmetry. As the branching part (25) or the combining part (26), a directional coupler may be used.

The preferable embodiment of the above described optical modulator is the one that is provided with an asymmetric directional coupler at the branching part (25) of the main Mach-Zehnder waveguide ($MZ_C$) (28), and controlled so that the intensity of the optical signal branched to the first sub Mach-Zehnder waveguide ($MZ_A$) by the asymmetric directional coupler is larger than that of the optical signal branched to the second sub Mach-Zehnder waveguide ($MZ_B$).

It is preferable for the optical modulator of the present invention to be provided with a control part electrically (or optically) connected to a signal source of each electrode so as to adequately control timing and phase of signals applied to each electrode. The control part acts as adjusting modulation time of a modulation signal applied to the first electrode (electrode A) and the second electrode (electrode B) and a modulation signal applied to the first main Mach-Zehnder electrode ($MZ_{CA}$ electrode) and the second main Mach-Zehnder electrode ($MZ_{CB}$ electrode). In other words, the control part adjusts considering propagation time of light so that modulation by each electrode is performed to a certain signal. This modulation time is adequately adjusted based on, for example, a distance between each electrode.

A control part, for example, adjusts voltage applied to the first main Mach-Zehnder electrode ($MZ_{CA}$ electrode) and the second main Mach-Zehnder electrode ($MZ_{CB}$ electrode) so that phase difference of optical carrier signals or certain high order optical signals contained in output signals from the first waveguide ($MZ_A$) and the second waveguide ($MZ_B$) becomes 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of an optical signal outputted from a signal source, to signal source from an external output device. As the processing program, one that makes a computer have the following two means is adopted. One is a means for grasping phase of a certain component on each sub Mach-Zehnder, and the other is a means for generating an order to adjust a modulation signal applied to the first main Mach-Zehnder electrode ($MZ_{CA}$ electrode) and the second main Mach-Zehnder electrode ($MZ_{CB}$ electrode), so that the phase of a certain component is reversed, by using phase information of a certain information grasped by the means for grasping.

Hereinafter, an operation example of the optical modulation system is described. Sign wave RF signals, phase of which differs 90 degrees, are added to four optical phase modulators, which constitute $RF_A$ electrode and $RF_B$ electrode, on sub mach-Zehnder waveguides. With respect to light, bias voltages are applied to the electrode $DC_A$ and the electrode $DC_B$ so that phase difference of the optical signals becomes respectively 90 degrees. These phase difference of the electrical signal and the optical signals are adjusted as needed, but are basically adjusted to be an integral multiple of 90 degrees.

At points P and Q in FIG. 2, LSB signals outputted from $MZ_A$ and $MZ_B$ are adjusted to be opposite in phase, respectively. When these signals are added at the adding point (26), both LSB components are canceled out and only USB components exist. On the other hand, the phase difference of C electrode is adjusted to be 270 degrees, then USB signals are cancelled out and only LSB components exist. In reality, a carrier wave (carrier signal) or a high order component (e.g. a second order component ($f_0 \pm 2f_m$)) is contained in the optical signal.

In other words, the phase of a carrier wave (carrier signal) or a high order components (e.g. a second order component ($f_0 \pm 2f_m$)) of optical signals outputted from each sub Mach-Zehnder waveguide are decided by phase or bias voltage of signals applied to each sub Mach-Zehnder waveguide. Therefore, components to be suppressed are effectively suppressed by adjusting phases of output signals from each sub Mach-Zehnder waveguide so that the phases of components to be suppressed (carrier waves (carrier signals) of an optical signal or a high order component (e.g. a second order component ($f_0 \pm 2f_m$)) are reversed, before combined at the combining part. By this control, components to be suppressed are effectively suppressed.

Instead of an optical SSB modulator (2), an optical carrier suppressed double side band (DSB-SC) modulator may be used. Ideally, the DSB-SC modulator outputs two sub-bands, and suppress a carrier-wave constituent.

A phase modulator or an intensity modulator may be used instead of the optical SSB modulator (2). In this case, what is necessary is just to use the optical filter for choosing a specific sub-band if needed. Specifically, a phase modulator or an intensity modulator may be used instead of the optical SSB modulator (2) in FIG. 1. And what is necessary is just to prepare the optical filter which penetrates a specific sub-band alternatively downstream from a phase modulator. The optical filter which penetrates a specific sub-band may be prepared downstream from an intensity-modulation device.

The Source of Bias Voltage (3).

The source of bias voltage (3) is a unit for obtaining the bias voltage impressed to an optical SSB modulator. The well-known bias power source used for an optical SSB modulator may be sufficient as the source of bias voltage. The source of bias voltage (3) has a desirable thing with the functionality to change bias voltage accommodative according to a disturbance or sweep requirements. To the source of bias voltage (3), the detected information from a photodetector (8) is fed back, for example. And when a detection value shifts from the span appointed beforehand, it is preferred to control to lessen the gap. As for the source of bias voltage, what can measure requirements, such as a temperature which the source of bias voltage set, for example is desirable. The desirable source of bias voltage can adjust the bias voltage which is to be applied to an optical SSB modulator according to a measured value.

The Source of a Modulation Signal (4).

The source of a modulation signal (4) is a unit for generating the modulation signal which is to be applied to an optical SSB modulator. The source of a modulation signal of the present invention (4) contains an arbitrary waveform generator (5) and an electrical-signal frequency multiplier (6). An arbitrary waveform generator (5) generates the electrical signal which has arbitrary waveforms. An electrical-signal frequency multiplier (6) carries out the multiplying of the frequency of the electrical signal generated in the arbitrary waveform generator (5).

Arbitrary Waveform Generator (5)

An arbitrary waveform generator (5) stores the defined waveform data in a waveform memory, for example. And an arbitrary waveform generator carries out the read-out analogue translation of the storing data one by one. Thus, an arbitrary waveform generator generates the analog-spectrum form corresponding to the defined waveform data.

Example of the arbitrary wave form generator is the ones which disclosed Japan Patent Laid Open publication Hei 06-6137 and Hei 3-136178. Hei 06-6137 discloses "An arbitrary wave form generator comprising memory which stores wave form data. The wave form are differentiated in a prescribed timing by a differentiation device and outputted sequentially to D/A converter sections via a distributor. The data from the D/A converter sections are accumulated by an integration device in an operating timing of a memory section sequentially and the sum is outputted to an analog adder. The analog data subject to D/A conversion sequentially by the 4-phase D/A converter sections are finally added by the analog adder and an object waveform is obtained."

Hei 3-136178 discloses "The address to be given to a waveform memory is generated by an address generating means, and it is always monitored by a last address detecting means whether the address is the last address or not. When the trigger input is inputted to a waveform switching circuit, this circuit generates the waveform switching signal, which updates the first address to be taken into the address generating means, synchronously with the coincidence signal outputted from the last address detecting means thereafter. Waveform data is switched to another and it is outputted. Thus, plural kinds of continuous repeated waveform are successively switched by the trigger input."

The arbitrary waveform generator can generate a complicated waveform. An arbitrary waveform generator generates frequency sweep signal wave type with a short time coefficient as a computer data. An arbitrary waveform generator carries out the D-A conversion of it. Then, the arbitrary waveform generator can generate the ultra high-speed frequency sweep signal of 1 millisecond or less of sweep time.

Typical frequency sweep spans are 500 MHz-300 MHz. The examples of a time coefficient are 500 microseconds, 50 microseconds, 5 microseconds, and 0.5 micro second. Moreover, the sequence of a sweep may be complicated. For example, after carrying out a frequency sweep to 300 MHz-400 MHz, stopping a desired time, for example, the frequency sweep between 1 micro second, and then carry out a sweep to 450 MHz-500 MHz. The arbitrary waveform generator can make it able to synchronize with a desired event, and can also perform a frequency sweep operation only in the predetermined time span. For example, it is programmable beforehand that only a predetermined numbers of times performs a frequency sweep operation according to the trigger signal using the unit which detects a desired event and generating a trigger signal. Thus, the arbitrary waveform generator can generate a fast sweep signal in a complicated sequence. However, an arbitrary waveform generator has the problem that the frequency which can be generated is restricted to 500 MHz or less.

Electrical-Signal Frequency Multiplier (6)

An electrical-signal frequency multiplier (6) is a unit for carrying out the multiplying of the frequency of the inputted electrical signal, and outputting it. A well-known thing can be suitably used for an electrical-signal frequency multiplier (6).

An example of the electrical-signal frequency multiplier (6) is a one which is disclosed in the Japan Laid Open patent 2005-167317(US 2006-0261903), "An oscillator for generating an oscillating signal having desired frequency, comprising: a reference oscillating section for generating a reference signal having predetermined frequency; a plurality of first variable delay circuits, connected in cascade, for receiving said reference signal and outputting said received reference signal by sequentially delaying by almost equal value of delay; a phase comparing section for comparing phase of said reference signal generated by said reference oscillating section with phase of a delay signal outputted out of a final stage of said plurality of first variable delay circuits; a delay control section for controlling a value of delay of said plurality of first variable delay circuits so that the phase of said reference signal becomes almost equal to the phase of the delay signal outputted out of the final stage of said plurality of first variable delay circuits; and a frequency adding circuit for generating said oscillating signal in which edges of said respective input signals are combined by logically operating the input signals inputted to said respective first variable delay circuits."

Another example of the electrical-signal frequency multiplier (6) is a one which is disclosed in the Japan Laid Open patent 2002-64335(US 2002-0024411), "A distributed balanced frequency multiplier comprising: a branching section, having first and second input transmission lines, each of said first and second input transmission lines having first and second ends, said first ends of first and second input transmission lines being coupled to a branch point, distributing a fundamental input signal from said branch point to said first and second input transmission lines; a joining section, having first and second output transmission lines, each of said first and second output transmission lines having first and second ends, said second ends of first and second output transmission line being coupled to a join, synthesizing signals from said first and second output transmission lines at said join; a first transistor, having a control input and a current path, said control input being coupled to said second end of first input transmission line, a first end of said current path being grounded, a second end of said current path being coupled to said first end of first output transmission line; a second transistor, having a control input and a current path, said control input being AC grounded, first and second ends of said current path being coupled to said second end of second input transmission line and said first end of second output transmission line, respectively; and an amplitude attenuating element coupled to one of said first input transmission line, said second input transmission line, said first output transmission line, or said second output transmission line."

Still another example of the electrical-signal frequency multiplier (6) is a one which is disclosed in the Japan Laid Open patent 2001-156548(US 2002-0075045), "A frequency multiplier comprising: a differential signal generating circuit for receiving a sinusoidal wave input signal with an original frequency and generating two signals of which a frequency is as same as said original frequency of the input signal and a phase difference is 180°; and a multiplying circuit for multiplying two signals output from said differential signal generating circuit and generating a signal including a frequency component which is double of said original frequency of said input signal, wherein said frequency multiplier is characterized of generating an output signal multiplied by said original frequency of said input signal". An example of the electrical-signal frequency multiplier (6) is a 32 multiply type one.

An electrical signal frequency multiplier is realizable using the non-linearity of an amplifier, for example. That is, in the present invention, it is desirable to use the electrical-signal frequency multiplier which has an amplifier which has a non-linearity. If it explains concretely, the desirable embodiment of the electrical-signal frequency multiplier of the present invention will obtain the multiplying device of a high order by using to take out the higher harmonic of a device with a non-linearity with a light filter etc. as many stages. Thus, since a multiplying device is realized using a non-linearity, generally in an output, the information represented by intensity on an input signal is lost. On the other hand, about a frequency, the output signal has a frequency which multiplying the frequency of an input signal. Further, a phase change becomes that in which the phase change of the input signal carried out multiplying order. Since a phase change will be multiplying order, the phase noise of an output signal will also be multiplying order. Moreover, the signal purity of an output signal deteriorates to some extent compared with that of an input signal. On the other hand, the frequency becomes multiplying order of an input-signal frequency, correctly. That is, an electrical-signal frequency multiplier loses an amplitude information. However, an electrical-signal frequency multiplier is correctly controlled by an input signal about a frequency. Moreover, when a frequency sweep signal is inputted as an input signal, a time coefficient remains as it is and multiplying order times is carried out. Therefore, the time concerning carrying out the sweep of the fixed frequency range is set to 1 for a multiplying order. That is, the sweep rate which carries out the sweep of the fixed frequency range will be multiplying time order.

Optical Photo Detector (8)

Am optical photo detector (8) is a unit for detecting an optical signal. A suitable Optical photo detector should just be chosen according to a destination.

A Light-Source (9)

A light source (9) is a unit for generating the light inputted into an optical SSB modulator. The example of a light source (9) is a well-known wavelength variable laser. When carrying out the sweep of the optical frequency especially in a comparatively narrow frequency range, the light source of an in use of a fixed wavelength may be used. When using a wavelength variable laser, it is preferred to make the control of a wavelength variable laser and an operation of an optical frequency sweep be related. For example, controlling a wavelength variable laser performs the coarse control of an optical frequency. Moreover, an optical frequency sweep tunes finely. Thereby, a frequency range is expanded and highly precision is attained. Therefore, as for a light source (9) and the source of a modulation signal (4), it is desirable to be connected to control devices, such as a computer which is not depict in figures, respectively. A control device has a synchronous measure for taking a synchronous of a wavelength variable laser and an optical frequency sweep, for example. And an operation is controlled by the organization for interlocking those operations. That is, the optical cycle control device of the present invention has a desirable thing possessing an above-mentioned measure and organization. Moreover, you may perform the optical frequency sweep of two or more frequency components at once by making an optical comb generator into a light source. In addition, the output of an optical SSB modulator may be used as a light source of a comb generator. The light source possessing the light filter which chooses a specific thing among two or more frequency components especially generated from the optical SSB modulator or the comb generator is desirable. That is because the span where the sweep of the optical frequency is carried out spreads.

Figure 3:
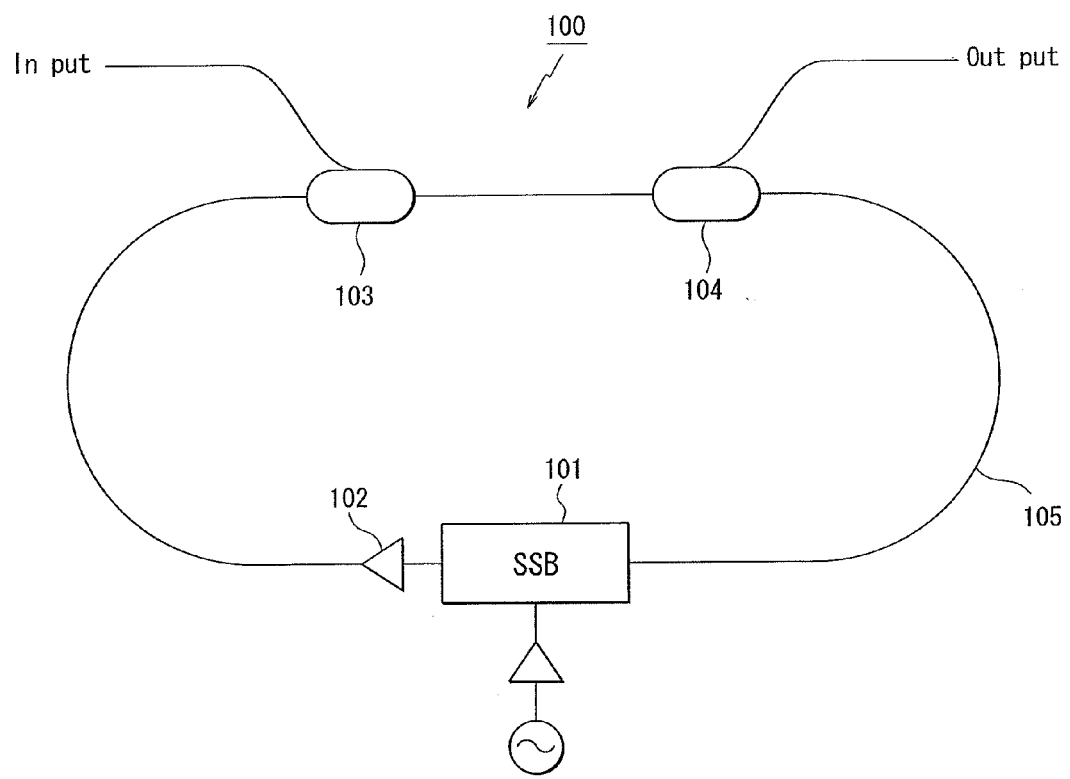
FIG. 3 is a schematic diagram showing the example of a stream composition of an optical comb generator.

FIG. 3 shows a basic arrangement of a conventional optical comb generator using an optical SSB modulator (hereinafter, also called simply as "optical comb generator"). As shown in FIG. 3, an optical comb generator (100) is composed of an optical fiber loop (105) provided with an optical SSB modulator (101), an optical amplifier (102) for compensating a conversion loss by the optical SSB modulator, an optical input port (103), and an optical output port (104). It is to be noted that the optical SSB modulator is an optical modulator capable of obtaining an output light having shifted just an amount of a frequency of a modulating signal. Hereinafter, a basic operation of the optical comb generator will be described.

An input light (106) is inputted to the input port (104) of the optical comb generator. The input light is a continuous light ($f_0$) of a single mode. Then, a frequency of the input light is shifted ($f_0$, $f_0+f_m$) by the optical SSB modulator (101). A light component (107) whose frequency has been shifted, circles the loop to be combined with a new light inputted to the input port ($f_0$, $f_0+f_m$). These lights are guided to the optical SSB modulator (101), and frequencies of both components are shifted ($f_0+f_m$, $f_0+2f_m$). By repeating these processes, lights having numerous spectrum components (an optical comb) can be obtained.

Figure 4:
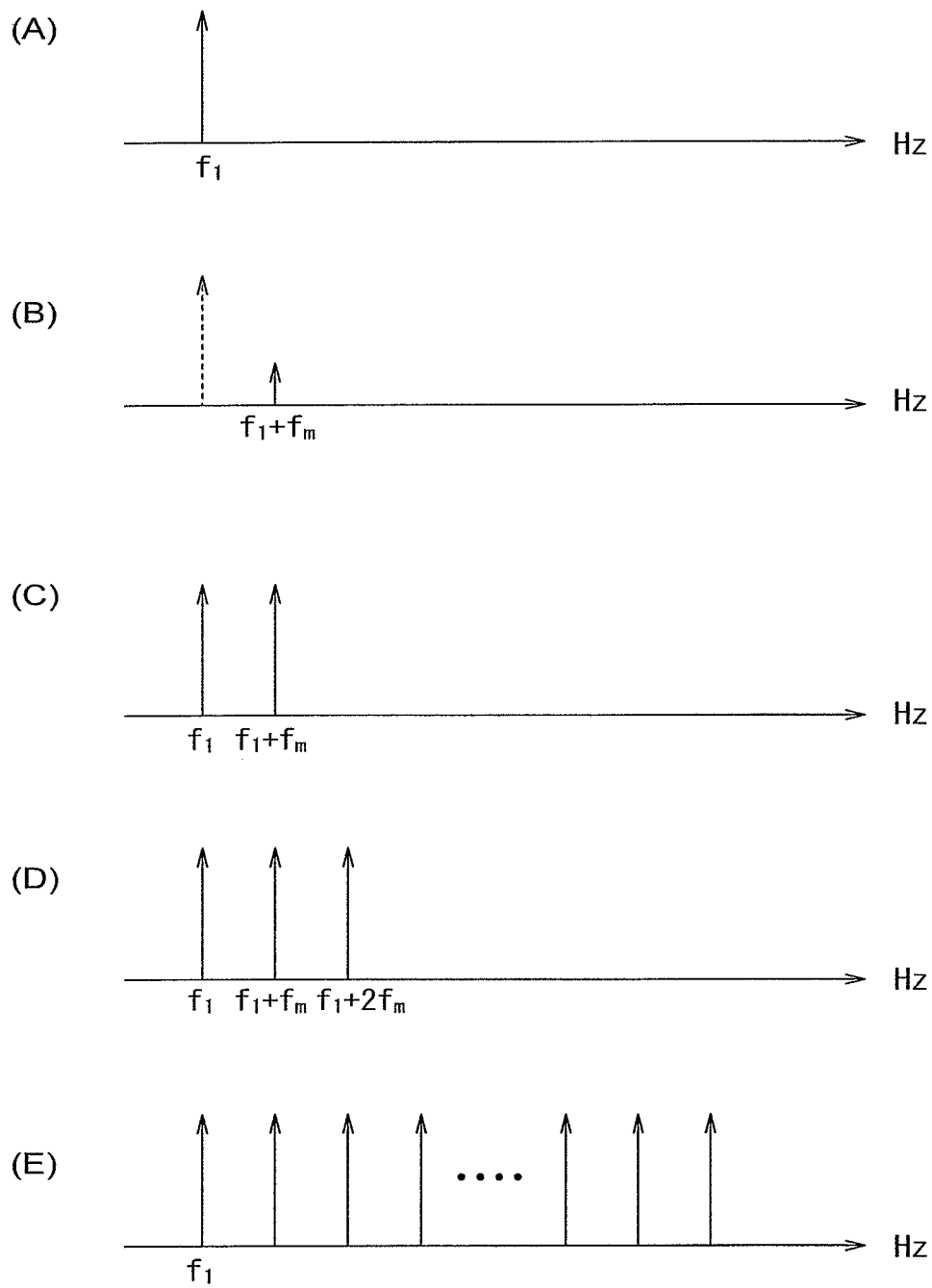
FIG. 4 is a conceptual diagram showing the status of the light in each process in an optical comb generator.

Hereinafter, an operation example of the multiple wavelength light source of the present invention will be described. FIG. 4 is a schematic diagram showing a state of light in each process. FIG. 4A shows a state where the first light is inputted. FIG. 4B shows a state of an output light of an optical SSB modulator. FIG. 4C shows a state where an SSB modulated light and a new light are combined, FIG. 4D shows a wave combined state of the third round. FIG. 4E is a schematic diagram of a light comb derived from the input light $f_1$. Firstly, the optical adjusting portion adjust a plurality of lights (expressed as $f_1$, $f_2$, $f_3$, and $f_4$) having different wavelengths (therefore having different frequencies). The plurality of lights having different wavelengths enters the optical input port (103) (FIG. 4A). The plurality of lights enters the optical SSB modulator (191) through the optical fiber loop (105). Then, the optical SSB modulator outputs optical single sideband signals ($f_1$+fm, $f_2$+fm, $f_3$+fm, and $f_4$+fm) having shifted from the frequency of the input light by the frequency of the modulating signal (FIG. 4B). The optical amplifier (102) increases the optical intensities of the output lights of the optical SSB modulator to compensate the optical intensities weakened by the optical modulation. The output lights from the optical amplifier reach the optical input port (103) through the optical fiber loop (105). The output lights ($f_1$+fm, $f_2$+fm, $f_3$+fm, and $f_4$+fm) from the optical modulator (102) and the lights ($f_1$, $f_2$, $f_3$, and $f_4$) are combined at the optical input port (103) as ($f_1$, $f_1$+fm; $f_2$, $f_2$+fm; $f_3$, $f_3$+fm; and $f_4$, $f_4$+fm) (FIG. 4C). When these processes are repeated once more, the wavelength multiplexed lights including the third channel ($f_1$, $f_1$+fm, $f_1$+fm+2fm $f_2$, $f_2$+fm, $f_2$+fm+2fm; $f_3$, $f_3$+fm, $f_3$+fm+2fm; and $f_4$, $f_4$+fm, $f_4$+fm+2fm) can be obtained (FIG. 4D). By repeating these processes, an optical comb (FIG. 4E) that is a collection of lights whose optical frequencies are sequentially shifted can be obtained.

Polarization Controller (11)

A polarization controller (11) is the arbitrary members for adjusting the plane of polarization etc. of the light outputted from a light source (9). As a polarization controller, a well-known polarization controller may be used.

Amplifier (12)

An amplifier (12) may just amplify the intensity of an electrical signal. A well-known amplifier is used. Moreover, amplifiers are arbitrary members. An amplifier does not need to be used.

Coupler (13)

A coupler (13) is adopted suitably and deals in what is used in order to obtain the modulation signal of an optical SSB modulator. An example of the coupler is a coupler which can shift 90 degrees of phases of an output signal. For example, the modulation signal from which a 90-degree phase shifted is a coupler impressed to the modulating electrode of each Sub Mach-Zehnder waveguide. Moreover, a coupler does not need to be used if modulation signals, such as an optical SSB modulation, can be obtained. That is, couplers are arbitrary components.

The span of the frequency of the optical signal which an optical-frequency control device generates is set to $f_0 \pm n \times f_1 - f_0 \pm n \times f_2$. Plus or minus is changed by adjusting the voltage (bias voltage of a main Mach-Zehnder wave guide) to a digital cassette controller electrode is adjusted, or the phase relationship of a modulation signal. Wherein $f_0$ is a modulator input optical frequency. $f_2$ is the output highest frequency of an arbitrary waveform generate equipment. $f_1$ is the output lowest frequency of an arbitrary waveform generate equipment. n is the number of multiplying of an electrical-signal frequency multiplier.

FIG. 1 explains how to drive the optical frequency control device of this invention. First, an optical signal is output from the light source (9).This optical signal can be a single light or an optical comb light. For simplicity, the following describes a situation with one light with a frequency of $f_0$. The light from the source, for example, by way of adjustment of the polarized light surface on the polarization controller (11), enters the optical SSB modulator (2). The example of the optical SSB modulator (2), comprises, as shown in FIG. 2, two sub Mach-Zehnder waveguides on two arms of the main Mach-Zehnder waveguides. The bias voltage from the bias voltage source is applied on the various electrodes for the purpose of performing SSB modulation. This bias voltage is commonly known. On the other hand, the modulation signal of the optical SSB modulator is generated by the modulation signal source (4). More specifically, the arbitrary waveform generator (5) generates an electrical signal endowed with an arbitrary waveform (or predetermined waveform), and the electrical signal frequency multiplier device (6) multiply the frequency of the electrical signal. The multiplied signal obtained above, for example, is amplified by the amplifier (12). And then it is split according to the shape of the electrode of the optical SSB modulator at the coupler (13), and the phase of the signal is controlled. Then, the electrical signal from the coupler (13) is applied as the modulation signal on the optical SSB modulator. The arbitrary waveform generator (5) can sweep the frequency of electrical signals at high speed and with high precision. Also, the electric signal frequency multiplier (6) can multiply the frequency of swept electrical signals at high speed and with high precision. Thus, by combining these, it is possible to sweep a wide frequency of electrical signals quickly. Also, by applying a modulation signal to those electrical signals, the optical SSB modulator can output a wide range of frequencies of optical signals at high speeds. The arbitrary waveform generator (5) is capable of sweeping with a high speed, but the upper frequency limit of the outputted signal was 500 MHz. By combining with the electrical signal multiplier (6), the frequency range can be expanded and the sweep rate per unit of frequency will be further improved. Concerning the combination of conventional signal generators and the electrical signal multiplier (6), while the speed of sweeping is improved, the sweep speed of the signal generator itself is lower and thus the effectiveness is limited. In turn, as the arbitrary waveform generator is capable of complex amplitude control, in cases where the emitted signal has a high frequency, when amplitude information has been retained by use of a frequency conversion mixer, the output, without the idea of being input into the electrical signal multiplier, the swept frequency rate will be the same as the arbitrary waveform generator sweep speed. Furthermore, for frequency scanning by the optical SSB modulator, as the stability and certainty of the modulation signal is most important, amplitude fluctuation can be deducted from the measurement data after the fact, or, these effects can be easily removed through the input or output signal of the optical SSB modulator to compensate for fluctuations in the magnitude and intensity of amplitude. In addition, when sweep speed in the case of frequency sweep with the optical SSB modulator is slow, as was disclosed in non-patent literature 2, it was necessary to adjust frequencies one by one and remove bias voltage to suppress non essential components. However, the inventors acquired the new knowledge that it is possible to suppress an unnecessary constituent completely, under the condition of fixed bias, when a sweep rate was fast, as it was shown in a working example (see FIGS. 6, 7, and 8). The high speed frequency sweep of the arbitrary waveform generator and the frequency range expansion made possible by the electric signal multiplier causes an improvement in sweep speed for frequency unit, and although amplitude correction for frequency sweep by way of the optical SSB modulator is simple, the accuracy of frequency is very important. A sweep fast enough that no component is suppressed as shown in FIG. 1, was not possible with available technology until now; now ultra high-speed optical sweeps have become possible. While it is possible to conduct optical frequency control by altering the electric current supplying the laser, the relation of current and frequency is complex and susceptible to temperature and noise interference. Also, there is a "mode hop" phenomenon where the frequency at the time of frequency sweep can suddenly change drastically and high-precision measurements are not suitable. In contrast with this, as seen in the composition of FIG. 1 the amount of frequency shift, by accurately multiplying the modulation signal frequency the "mode hop" phenomenon and other erratic behavior will not occur. By using higher order sideband frequencies with optical SSB modulators or other modulators frequency alteration and sideband will furthermore become several times as large.

2. Optical Frequency Control Signal Generator

Relating to the emission device aspect of the optical frequency control signal, by using the above mentioned optical frequency control device the frequency of output light can be controlled.

In particular, by using the optical frequency control device of this invention, a wide range of optical frequencies can be swept at high speed, and makes it possible to output the same frequency through the optical frequency control signal output device. In using the optical frequency control signal emission device, because a wide range of optical frequencies can be quickly swept, test objects can be exposed to light, light absorption can be measured, and the absorption spectrum for test objects can be rapidly measured. However, the inventor presents a situation where sweep speed is fast (FIG. 6 to 8), giving new insight into how through a status with a fixed bias waste components are sufficiently suppressed.

3. Precision Instruments of the Optical Filter

Relating to the precision instruments of the optical filter of this device, as in the above mentioned optical frequency control device (1), the light is output to the object to be measured (7), then the light that permeates the object as well as reflected light can be measured using the photo detector (8). In other words, the light filter is used as the object to be measured. As noted above, by using the optical frequency control device, a wide range of optical frequencies can be quickly swept, and the special characteristics of optical filters can quickly and accurately be measured.

4. Meter

Relating to the meter of this device, along with the above mentioned optical frequency control device (1), along with measuring the light output from the optical frequency control device, light absorption and reflection levels of the measured object is done by the photo detector (8), the detected value can be recorded and from the recorded values absorption as well as reflection rates are determined by the controller device. By using the meter in this way light absorption and reflection rates of the measured object can be quickly and accurately determined. Because of this, actions such as identification of chemical substances can be performed by this device. Furthermore, as a control unit this can be used in public computers, etc. The conversion efficiency from the input signal to the output signal of the optical SSB modulator can be recorded by a computer, a light source (9) with an intensity which is proportional to the inverse of the recorded number can be added, or an intensity modulator can be added to the output portion of the modulator and by adding it to the light output to maintain a constant output from the optical frequency control device (1). In this situation, from the intensity of the absorbed or reflected light from the measured object (7) the absorbability and reflectance of the object can be directly determined.

5. RF Signal Generator

Figure 5:
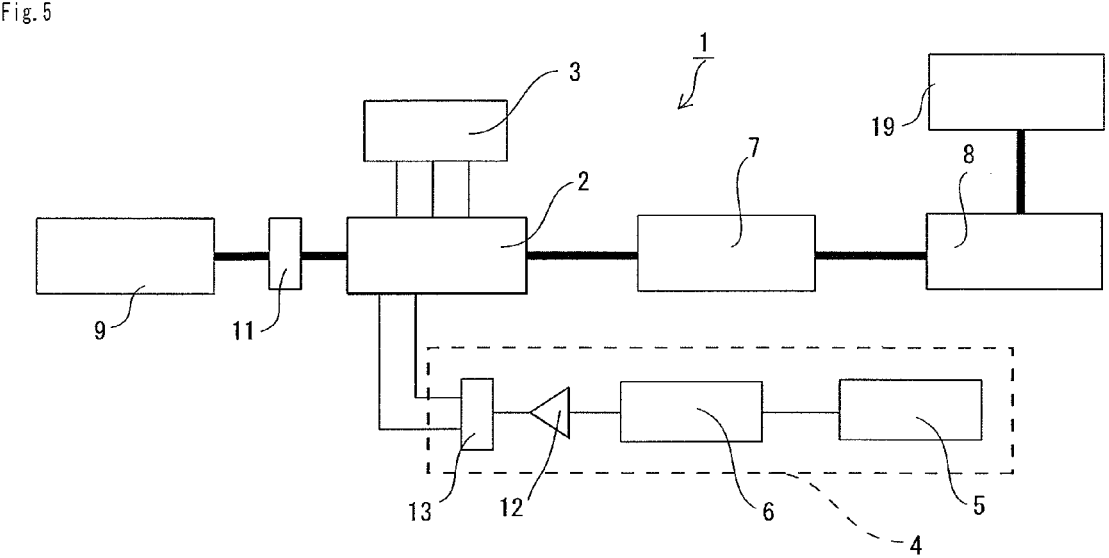
FIG. 5 is a schematic block diagram showing the generate equipment of the radio signal of the present invention.

FIG. 5 is a schematic block diagram showing the generator of the radio signal of the present invention. For elements that are the same as in FIG. 1 the same symbols have been appended. As shown in FIG. 5, the rf-signal generator of this device, acts as the incident light source (19) for the optical signal emitted from the optical frequency control device to be detected by the photo detector (8). The photo detector (8) detects the mixture of the outputs of the optical frequency control device (1) and the light source (19). Then, the photo detector (8) converts the detected optical signal into electrical signals and outputs them as rf signals. Furthermore, if a DSB-SC modulator is used as a modulator, rf-signals with a scope of $2 \times n \times f_1 \sim 2 \times n \times f_2$ can be obtained. The desirable embodiment for the rf-signal generator is that the first light source (9) for the optical frequency control device (1) and the second light source (19), which is the input light source of the photo detector of the optical frequency control device (1), for the optical signal of at least one of them to be adjustable so as to function as the method of controlling the optical frequency (for example a tunable-frequency laser). When inputting a separate light source (19)(Equal to the light source(9)) to the photo detector, by changing the difference in the optical frequencies of the two light sources (9), (19) the focus of the rf-signal output from the rf-signal generator can be controlled. In this case an rf-signal with a frequency range of $|f_0-f'_0 \pm n \times f_1| \sim |f_0-f'_0 \pm n \times f_2|$ can be obtained. (where $f'_0$ is the optical frequency of the light source (19).) The two light sources can also be composed of separate lasers, also the light from one laser can be modulated through a DSB-SC, giving rise to two separate optical frequencies.

Working Example 1

—Optical Frequency Sweep—

By carrying out the fast frequency sweep of the modulation frequency of the optical-frequency shifter by an optical SSB modulator, verified which realizes the ultra high-speed optical frequency sweep of an output light. Fundamentally in this working example, the unit of the stream composition of being shown in FIG. 1 was used.

As a light source (9), the Agilent 81689A compact wavelength variable laser was used. A main wavelength was 1550 nm and power was set to be 10 mW. In addition, the intensities in the polarization controller outgoing end were 6.1 dBm. Outputted light from a light source entered into the SSB modulator through the polarization controller.

As an optical SSB modulator (2), one which comprises two Sub Mach-Zehnder waveguides which are indicated by the above-mentioned non-patent document 1, which does not have any polarizer, comprises an external termination, and discrete type bias electrodes, was used. A power supply AD8711 was used as a source of bias voltage (3) and bias voltage to the optical SSB modulator (2) was applied. The conditions, such as a phase of bias voltage and intensity, were controlled using the control device of the bias voltage source (3).

As a source of a modulation signal (4), the arbitrary waveform generator (5) and the signal frequency multiplying device (6) were used. As a modulation signal, the band spreading of the chirp signal (300 MHz-500 MHz) generated in the arbitrary waveform generate equipment to (9.6 GHz-16 GHz) with 32 multiplying device were used. Specifically, Tektronix AWG710B was used as an arbitrary waveform generator (5). As a signal-frequency multiplying device (6), the 32 time multiplying device of a Sogo electronic company was used. As an intensity amplifier, SHP200 CP was used. As a 90 degrees coupler, the product made by KRYTAR, and 90 deg Hybrid Krytar 3060200 was used. A linear chirp signal was used as an output of AWG710B.

Frequency sweep time was 500 microseconds, 50 microseconds, 5 microseconds, or 0.5 microsecond. The amplitude of AWG710B was set to be linearly change amplitude which is 1.0 Vpp when a frequency is 300 MHz and is 0.5 Vpp when the frequency is 500 MHz.

The sampling rate was set to be 4.2 G sample per second.

Figure 6:
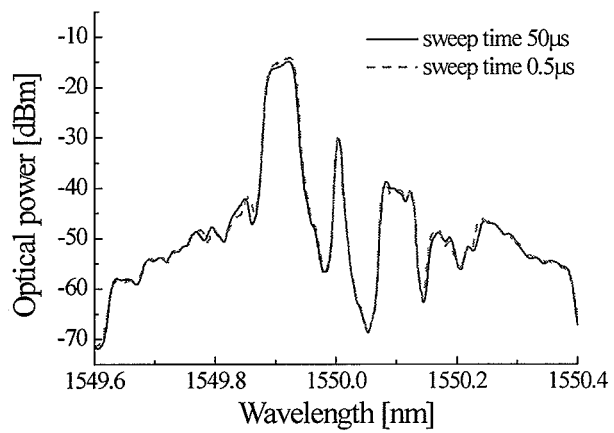
FIG. 6 is the graph replaced with figure in which the optical spectrum at the time of the USB signal generation of the working example 1 is shown.

As a measurement system (photodetector), oscilloscope screen design aid by recroy was used in combination with Optical spectrum analyzer: ADVANTEST CORP. Q8384 or a fast photo detector: Thorlab PDA8GS. FIG. 6 is the graph replaced with figure in which the optical spectrum at the time of the USB signal generation of the working example 1 is shown.

Figure 7:
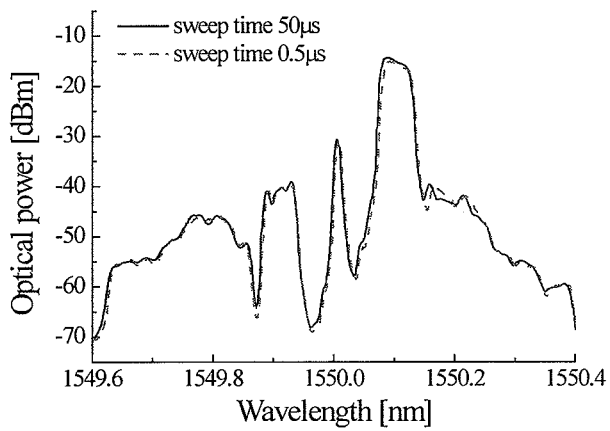
FIG. 7 is the graph replaced with figure in which the optical spectrum at the time of the LSB signal generation of the working example 1 is shown.

The measurement was executed with High-sense sweep mode. In the figure, Optical Power shows light intensity among a figure, and Wavelength shows a wavelength [nm]. A solid line shows the case in the sweep mode for 50 microseconds, and a dotted line shows the case in the sweep mode for 0.5 microsecond. The mean-value light intensity in the sweep mode for 50 microseconds which mean-value light intensity was −7.8 dBm, and in the sweep mode for 0.5 microsecond at which was −8.0 dBm. FIG. 7 is the graph replaced with figure in which the optical spectrum at the time of the LSB signal generation of the working example 1 is shown.

Figure 8:
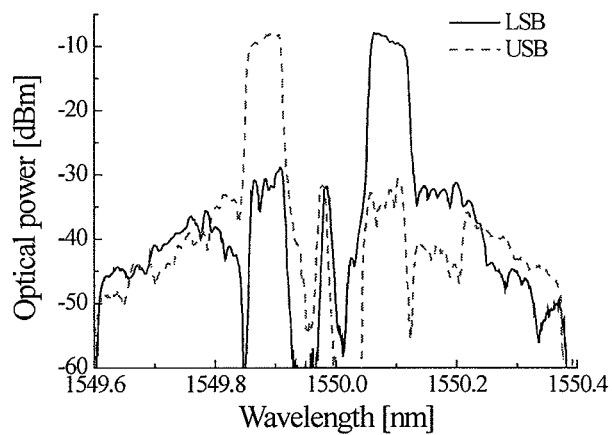
FIG. 8 is the graph replaced with figure in which an optical spectrum in case a time coefficient is 500 microseconds is shown.

The measurement was executed with High-sense sweep mode. In the figure, Optical Power shows light intensity among a figure, and Wavelength shows a wavelength [nm]. A solid line shows the case in the sweep mode for 50 microseconds, and a dotted line shows the case in the sweep mode for 0.5 microsecond. FIG. 8 is the graph replaced with figure in which an optical spectrum in case a time coefficient is 500 microseconds is shown.

In the figure, Optical Power shows light intensity among a figure, and Wavelength shows a wavelength [nm]. A solid line shows the case of a LSB signal and a dotted line shows the case of a USB signal.

FIGS. 6-8 show that an optical SSB modulation signal is obtained using the unit of the present invention.

Figure 9:
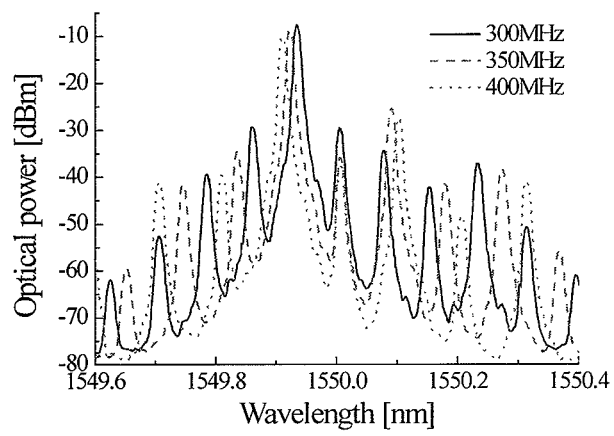
FIG. 9 is the graph replaced with figure which shows the optical spectrum at the time when the USB was generated, in which sine wave is adopted as a modulation signal.

FIG. 9 is the graph replaced with figure which shows the optical spectrum at the time when the USB was generated, in which sine wave is adopted as a modulation signal.

Figure 10:
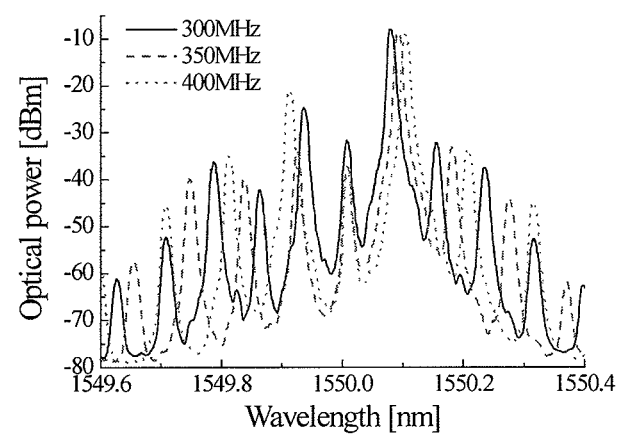
FIG. 10 is the graph replaced with figure in which the optical spectrum at the time when the LSB was generated, in which sine wave is adopted as a modulation signal.

The measurement was executed with High-sense sweep mode. In the figure, Optical Power shows light intensity among a figure, and Wavelength shows a wavelength [nm]. Moreover, a solid line shows the case where the frequency of the electrical signal outputted from an arbitrary waveform generator is 300 MHz, a dotted line shows the case of 350 MHz, and a dashed line shows the case of 400 MHz. FIG. 10 is the graph replaced with figure in which the optical spectrum at the time when the LSB was generated, in which sine wave is adopted as a modulation signal.

The measurement was executed with High-sense sweep mode. Optical Power shows light intensity among a figure, and Wavelength shows a wavelength [nm]. Moreover, a solid line shows the case where the frequency of the electrical signal outputted from an arbitrary waveform generator is 300 MHz, a dotted line shows the case of 350 MHz, and a dashed line shows the case of 400 MHz.

At the time of a fast sweep, an unnecessary constituent suppression ratio can be about 20 dB (peak hold sweep in 500 µs sweep of FIG. 8) to the whole region. On the other hand, as shown in FIG. 9 and FIG. 10, when a frequency is changed manually, it turns out that the suppression ratio may change sharply to be less than 20 dB. An RF amplifier output and a modulator input change with frequency characteristics at the time of a manual switchover. Moreover, the temperature change inside a modulator may have caused the bias point variation for the reasons of the loss inside a modulator having frequency characteristics. At the time of a fast sweep, it is thought that the frequency transition is quicker than a temperature change, and the temperature is fixed.

Working Example 2

—Measurement Equipment of an Optical Filter—

The special characteristic of the optical filter of two types shown below was measured using the apparatus of the working example 1.

The optical filter of the 1st type was product made by KOERAS dual section fiber grating (Dual section FBG), and the space character of the section was 10 mm. SN IFBG1737 whose reflectivity is 95% when the reflectivity of one section is made into a reflectivity, and the SN IFBG1736 whose reflectivity is 90% and SN IFBG1735 whose reflectivity is 85% were used. In addition, these optical filters have two or more narrow band transparency belts within the reflexogenic zone of FBG, and the space character was several 10 GHz. In this working example, the frequency sweep speed was set to be 0.5 microsecond. The wavelength of TLD was set to be 1550.3020 nm (IFBG1737), 1550.2750 nm (IFBG1736) and 1550.3080 nm (IFBG1735).

Figure 11:
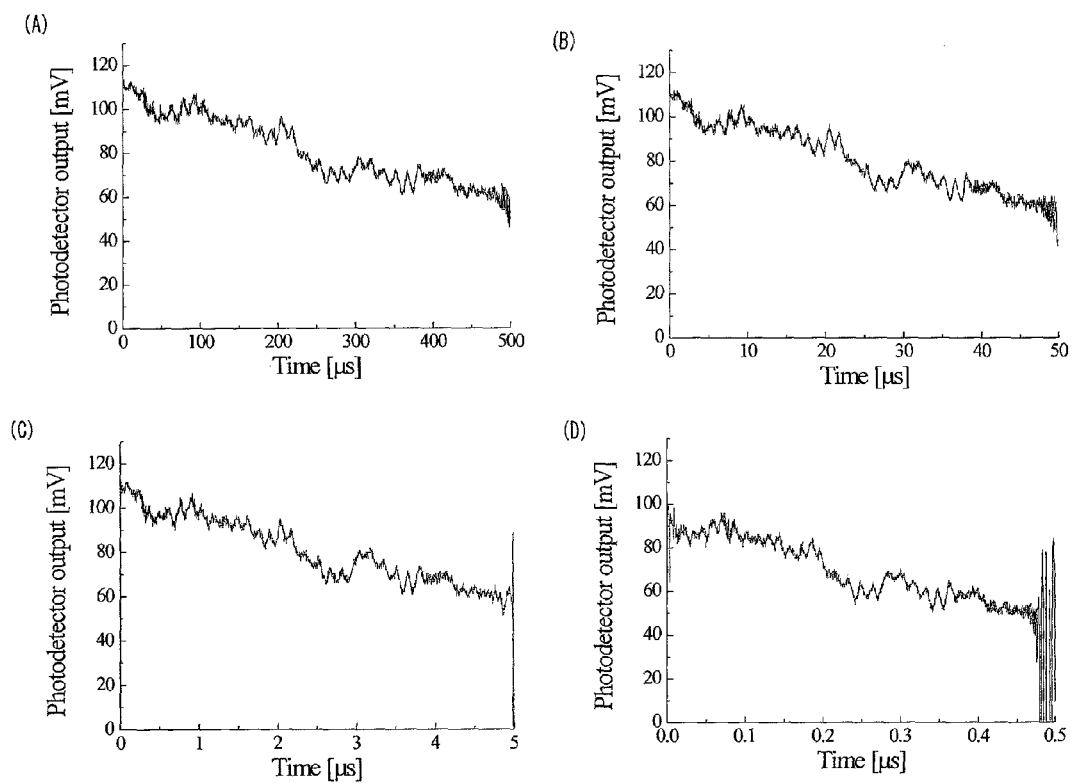
FIG. 11 is the graph replaced with figure in which the data for calibrations in the working example 2.

The optical filter of the 2nd type carries out cascade connection of the two FBG(s). The distance between FBG(s) was several meters. Specifically, Fixture FBG (THORLAB TG5F3) and variable FBG (AOS 25100154) were used. As for these, hosts have two or more narrow band transparency belts within the reflexogenic zone of FBG, and the space character was several 10 MHz. The frequency sweep speed was 0.5 microsecond, 5 microseconds, 50 microseconds, or 500 microseconds. The setups wavelength of TLD was 1550.35 nm. FIG. 11 is the graph replaced with figure in which the data for calibrations in the working example 2. FIGS. 11A, 11B, 11C, and 11D are figures showing the data for the calibrations when making frequency sweep speed 0.5 microsecond, 5 microseconds, 50 microseconds, or 500 microseconds, respectively.

Figure 12:
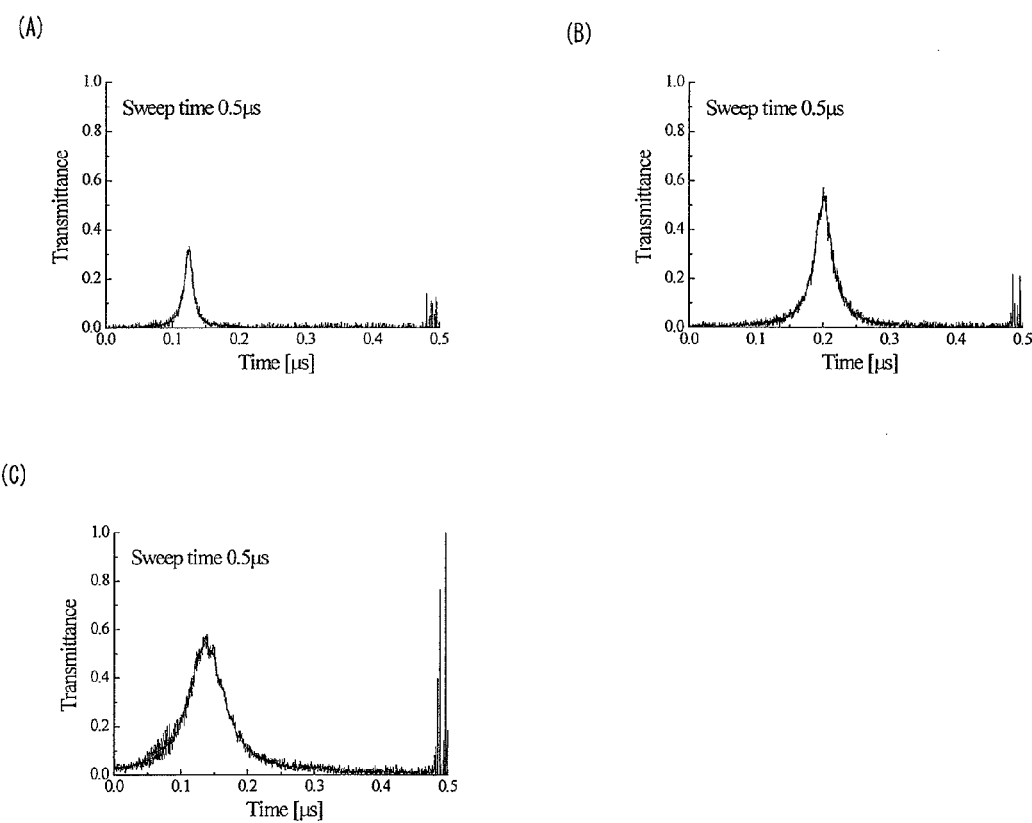
FIG. 12 is the graph replaced with figure in which the measurement result of the optical filter of the 1st type is shown.

A transitivity can be measured when a ratio with the data when putting in component parts (DUT) to be measured is taken. In addition, since direct-current offset of high-speed protect device protective device was as larger as 20 mV, from each data, direct-current offset was subtracted beforehand. FIG. 12 is the graph replaced with figure in which the measurement result of the optical filter of the 1st type is shown. FIGS. 12A, 12B, and 12C show that whose reflectivity is 95%, 90%, and 85%, respectively. The sweep time was 0.5 microsecond. FIG. 12 shows that the width of a transmission band becomes small, so that a reflectivity is high.

Figure 13:
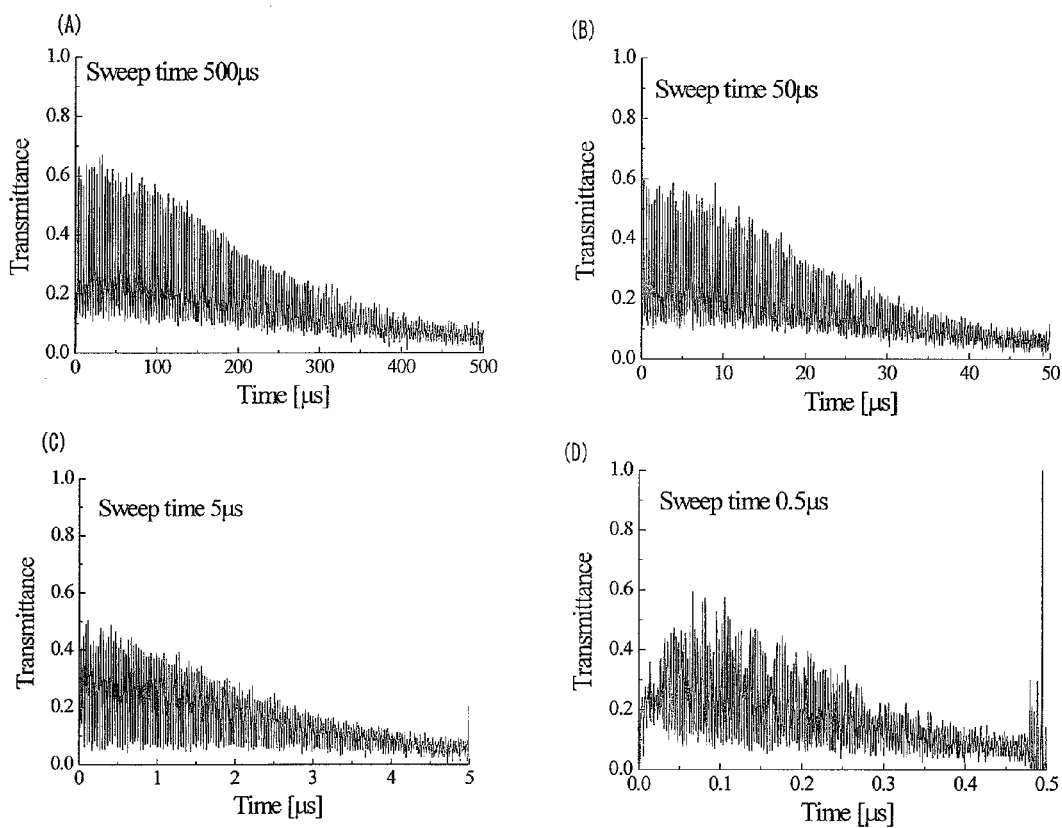
FIG. 13 is the graph replaced with figure in which the measurement result of the optical filter of the 2nd type is shown.

FIG. 13 is the graph replaced with figure in which the measurement result of the optical filter of the 2nd type is shown.

Figure 14:
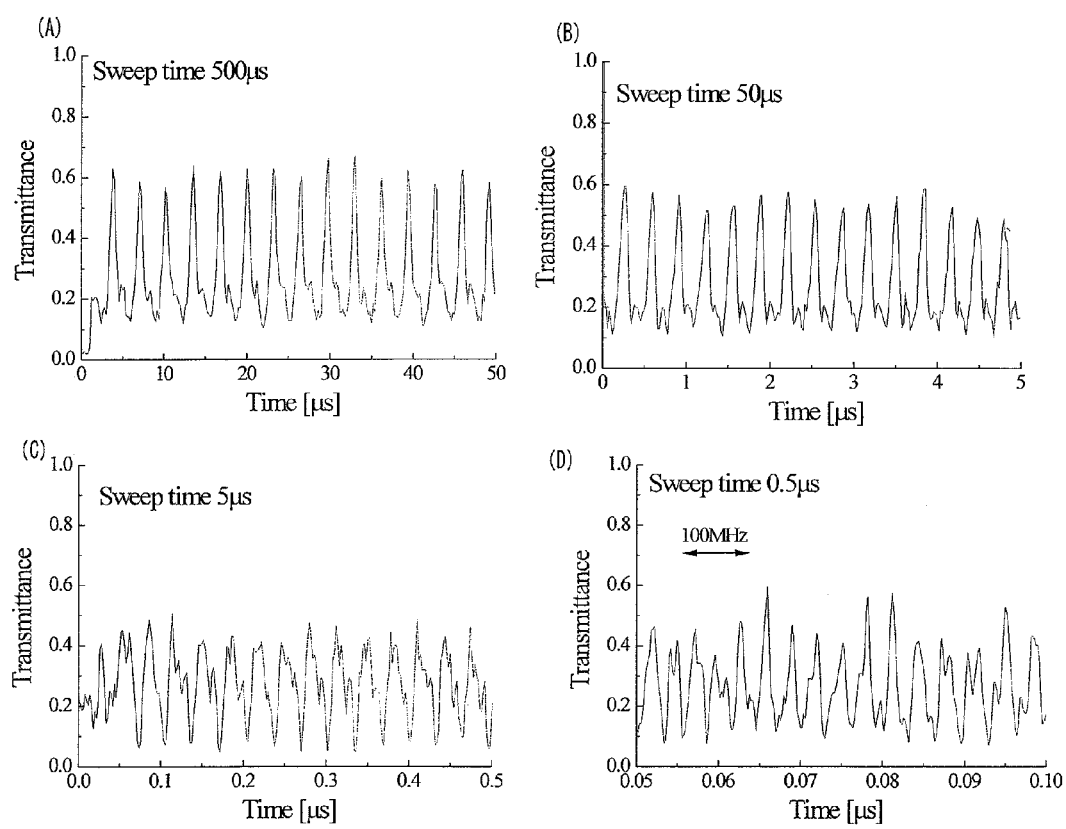
FIG. 14 shows the graph replaced with figure in which the enlargement of the sweep start-up part of FIG. 13 is shown.

FIGS. 13A, 13B, 13C, and 13D show that whose frequency sweep speed is 500 microseconds, 50 microseconds, 5 microseconds, and 0.5 microsecond, respectively. As shown in FIG. 13, the case where a sweep rate is 0.5 microsecond, and in the case of 5 microseconds, there was wave-like disorder at the time of the termination of a sweep start-up, and an intensity transition was not uniform. From this, as a frequency sweep speed, 0.5 microseconds or more is desirable and 10 microseconds or more is more desirable. FIG. 14 shows the graph replaced with figure in which the enlargement of the sweep start-up part of FIG. 13 is shown.

Figure 15:
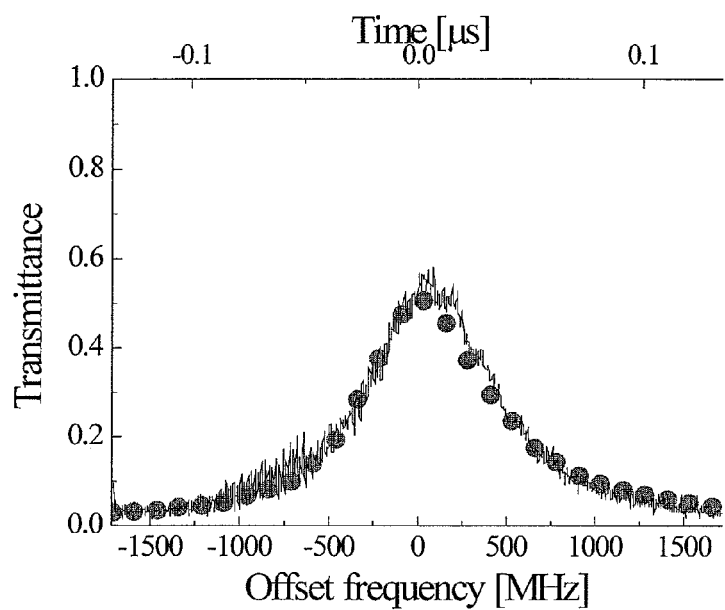
FIG. 15 is the graph replaced with figure in comparison with the measurement result according the measurement result of the optical filter of the 1st type to TLD.
Figure 16:
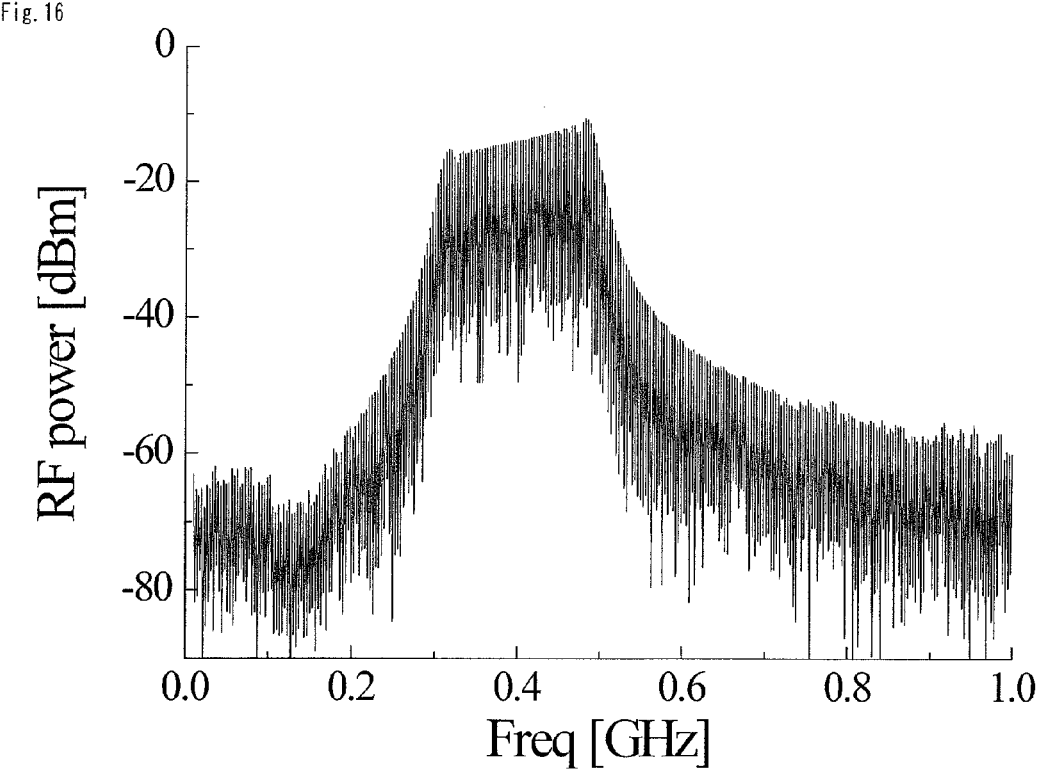
FIG. 16 is the graph replaced with figure in which the output signal of an arbitrary waveform generator (AWG) is shown.

FIGS. 14A, 14B, 14C, and 14D show that whose frequency sweep speed is 500 microseconds, 50 microseconds, 5 microseconds, and 0.5 microsecond, respectively. FIG. 14 shows that that whose frequency sweep speed is 500 microseconds and 50 microseconds has measured the transmission band of the hosts uniformly located in a line. FIG. 15 is the graph replaced with figure in comparison with the measurement result according the measurement result of the optical filter of the 1st type to TLD. The location of the peek was adjusted. The ordinate was not standardized with an actual measurement. An ordinate shows transitivity among a figure and a quadrate axis shows an offset frequency. FIG. 16 is the graph replaced with figure in which the output signal of an arbitrary waveform generator (AWG) is shown.

A frequency range is zero to 1 GHz. An ordinate is an intensity and a quadrate axis is a frequency. RF power means the intensity of an electrical signal among a figure, and Freq means a frequency. FIG. 17 is the graph replaced with figure in which the output signal of an arbitrary waveform generator (AWG) is shown.

A frequency range is zero to 5 GHz. An ordinate is an intensity and a quadrate axis is a frequency. RF power means the intensity of an electrical signal among a figure, and Freq means a frequency. FIG. 17 shows that 4.2 GHz each sides have a sampling noise. FIG. 18 is the graph replaced with figure in which the modulation signal impressed to an optical SSB modulator is shown.

FIG. 18A and FIG. 18B show the input signal to the output of a multiplying device, and the input signal for the $RF_A$ port of a modulator, respectively. FIG. 19 is the graph replaced with figure in which the input signal to an optical SSB modulator is shown. In FIG. 19A and FIG. 19B, a sweep rate shows the thing for 5 microseconds and 0.5 microsecond, respectively.

For example, since a spectrum space character was set to 2 MHz when a sweep rate is 0.5 microS, it was thought that the resolution of an optical-frequency measurement does not exceed this, either.

Working Example 3

Super-wideband RF chirp signal which mixes the light from which an optical frequency differs to the generated optical signal using the unit of the working example 1, and has a desired center frequency in it, was generated.

As a light source 1 (9), the Agilent 81689A compact wavelength variable laser was used. The central wavelength was set to be 1549.78 nm. The power was set to be 6 mW. The intensity at the output terminal of the polarization controller was 6.1 dBm. The output light from a light source entered into the SSB modulator through the polarization controller.

As a light source 2 (9), combined with the optical SSB modulator by interleaver was used. As an optical SSB modulator (2), one which comprises two Sub Mach-Zehnder waveguides which are indicated by the above-mentioned non-patent document 1, which does not have any polarizer, comprises an external termination, and discrete type bias electrodes, was used. Bias voltage was applied to the optical SSB modulator (2), using power-supply AD8711 as a source of bias voltage (3). The conditions such as a phase of bias voltage and intensity were controlled, using the control device of the source of bias voltage (3). The insertion loss was 4.8 dB. The bias voltage of the main MZ wave guide was 5.9V. The $DC_A$ electrode of Substitute's MZ bias voltage is 7.14V—the DCB electrode was 7.3V. In this working example, the USB signal was used.

As a source of a modulation signal (4), the arbitrary waveform generator (5) and the signal-frequency multiplying device (6) were used. As a modulation signal, the band spreading of the chirp signal (300 MHz-500 MHz) generated in the arbitrary waveform generate equipment to (9.6 GHz-16 GHz) with 32 multiplying device were used. Specifically, Tektronix AWG710B was used as an arbitrary waveform generator (5). As a signal-frequency multiplying device (6), 32 time multiplying device by a Sougou electronic company was used. As an intensity amplifier, SHP200 CP of EDSI, was used. As a 90 degrees coupler, KRYTAR 90 deg Hybrid Krytar 3060200 was used. In addition, frequency sweep time was 5 microseconds, using a linear sharp signal as an output of AWG710B. Moreover, when a frequency was 300 MHz and it was 0.5Vpp and 500 MHz, the altitude of AWG710B into a swing which serves as 1.0Vpp and which changes linearly. Moreover, the sampling rate was 4.2 GHz.

Figure 21:
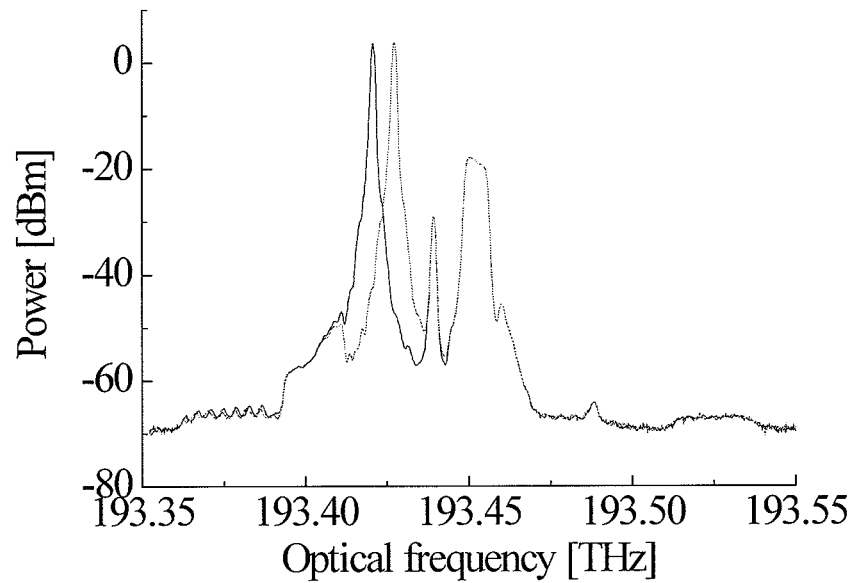
FIG. 21 is the graph replaced with figure which shows the optical spectrum at which the light source 2 was put to the long wavelength side.

Agilent PSA E4448A was used as a detector of an electrical signal, using the optical spectrum analyzer: ADVANTEST CORP. make Q8384 as a measurement system (photodetector). FIG. 20 is the graph replaced with figure which shows the optical spectrum at which the light source 2 was put to the short wavelength side. The solid line in a figure shows that whose wavelength is 1549.41 nm, and a dotted line shows that whose wavelength is 1549.48 nm. FIG. 21 is the graph replaced with figure which shows the optical spectrum at which the light source 2 was put to the long wavelength side.

Figure 22:
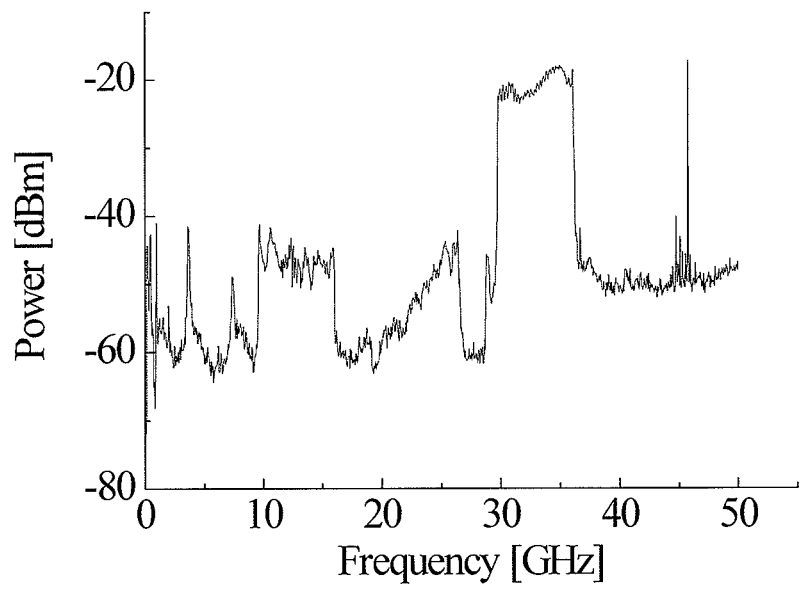
FIG. 22 is the graph replaced with figure which shows a radio-frequency spectrum when the wavelength of the light source 2 is 1549.41 nm.
Figure 23:
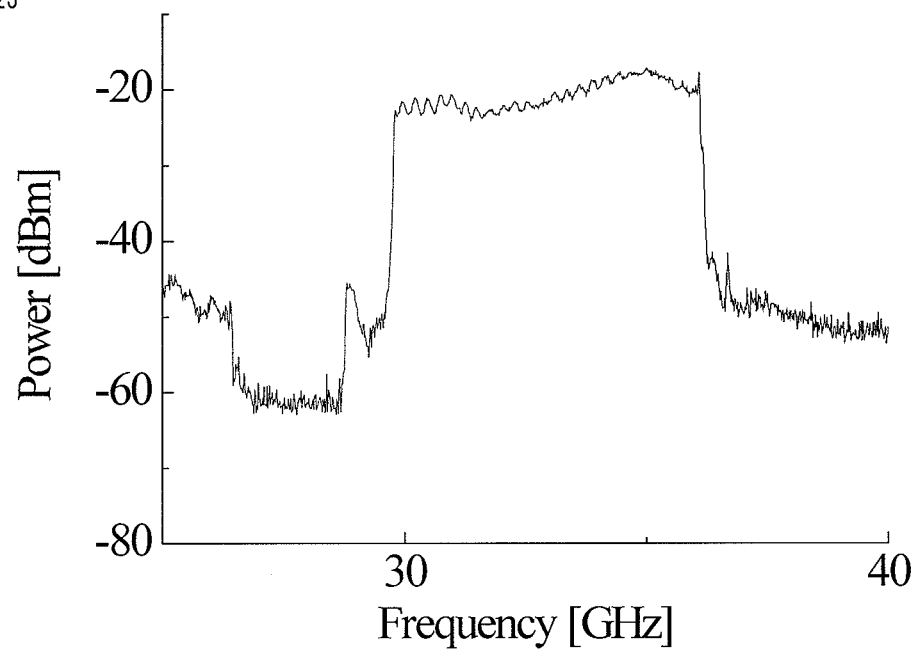
FIG. 23 is the enlarged figure of a part of FIG. 22.
Figure 24:
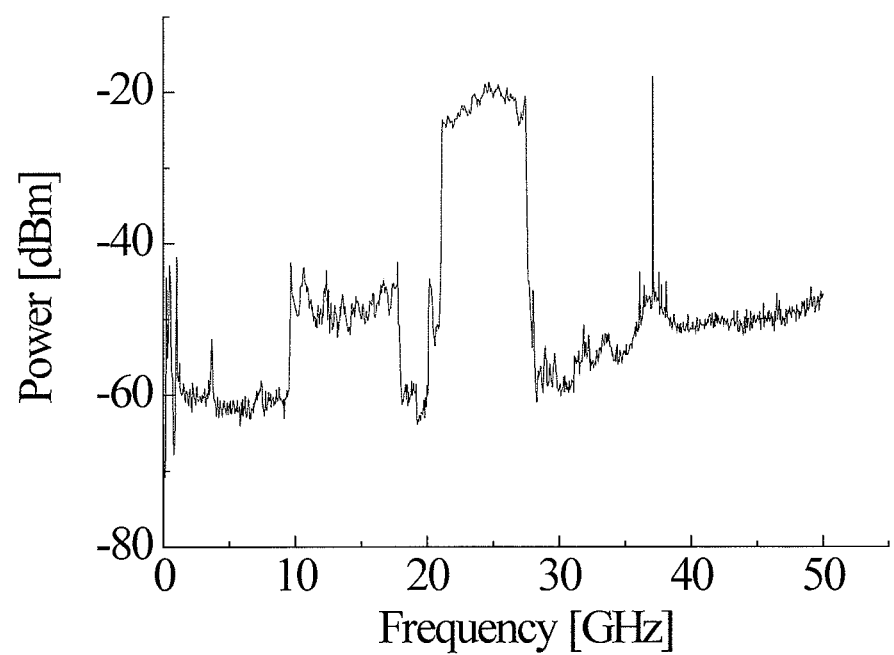
FIG. 24 is the graph replaced with figure which shows a radio-frequency spectrum when the wavelength of the light source 2 is 1549.48 nm.

The solid line in a figure shows that whose wavelength is 1549.93 nm, and a dotted line shows that whose wavelength is 1549.875 nm. FIG. 22 is the graph replaced with figure which shows a radio-frequency spectrum when the wavelength of the light source 2 is 1549.41 nm. The input optical-frequency difference was 46.2 GHz. An occurrence frequency example is from 36.6 GHz (46.2 GHz-9.6 GHz). It was 30.2 GHz (46.2 GHz-16.0 GHz). As shown in FIG. 22, 46.2 GHz has a beat with an SSB modulator remains carrier wave. 9.6 to 16 GHz is concept obtained as it is the intensity variation (beat of a remains carrier wave and USB) which an optical SSB modulator output has. Moreover, it is thought that the constituents of a 20-30 GHz belt are remains LSB of an SSB modulator output and a beat of the light source 2. FIG. 23 is the enlarged figure of a part of FIG. 22. FIG. 24 is the graph replaced with figure which shows a radio-frequency spectrum when the wavelength of the light source 2 is 1549.48 nm.

Figure 25:
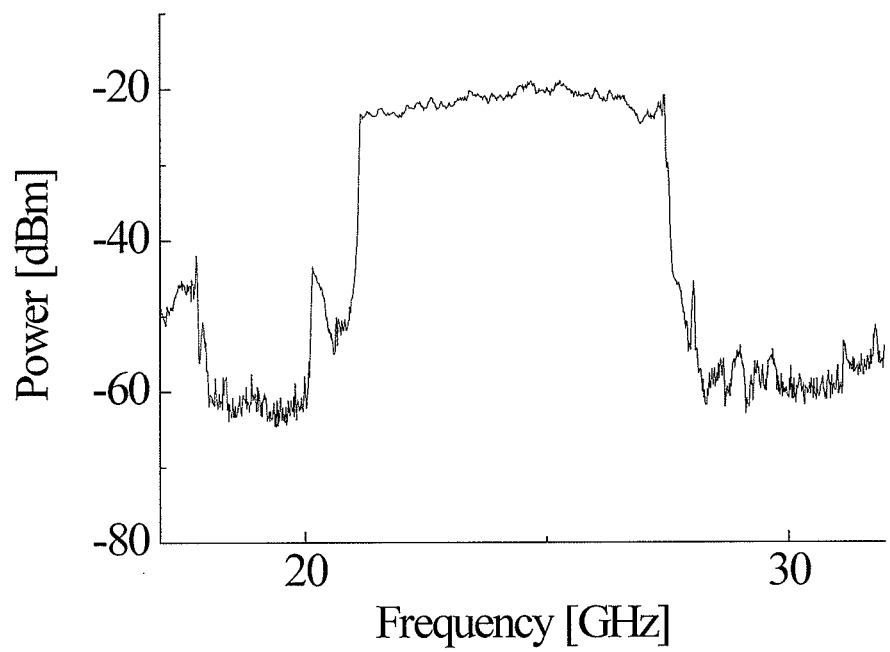
FIG. 25 is the enlarged figure of a part of FIG. 24.

The input optical-frequency difference was 37.5 GHz. An occurrence frequency example is from 27.9 GHz (37.5 GHz-9.6 GHz). It was 21.5 GHz (37.5 GHz-16.0 GHz). As shown in FIG. 24, 37.5 GHz has a beat with an SSB modulator remains carrier wave. Moreover, the constituents of a 10-20 GHz belt are considered to be remains LSB of an SSB modulator output, a beat of the light source 2, and an overlapping of the intensity variation (beat of a remains carrier wave and USB) which an SSB modulator output has. FIG. 25 is the enlarged figure of a part of FIG. 24.

Figure 26:
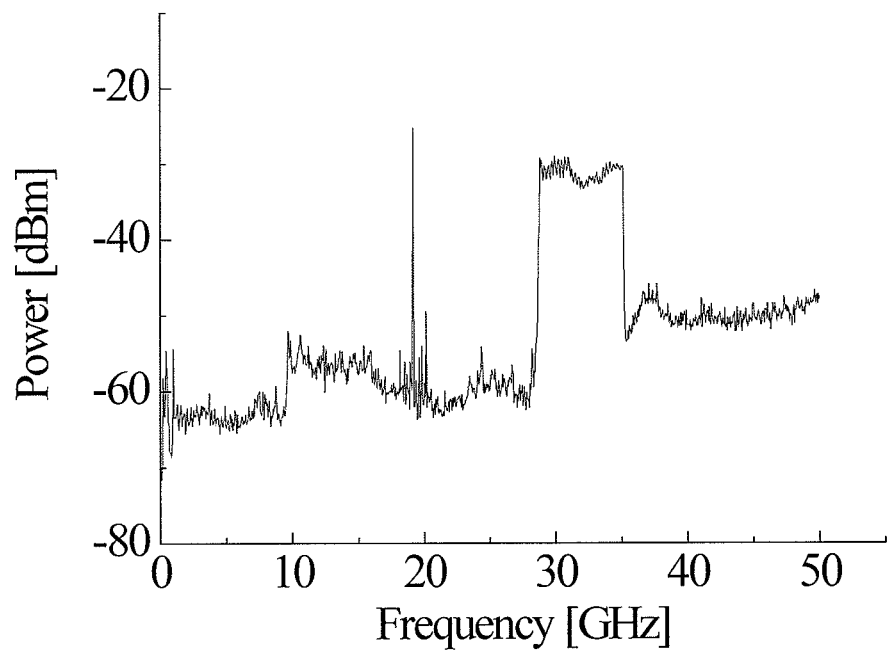
FIG. 26 is the graph replaced with figure which shows a radio-frequency spectrum when the wavelength of the light source 2 is 1549.93 nm.
Figure 27:
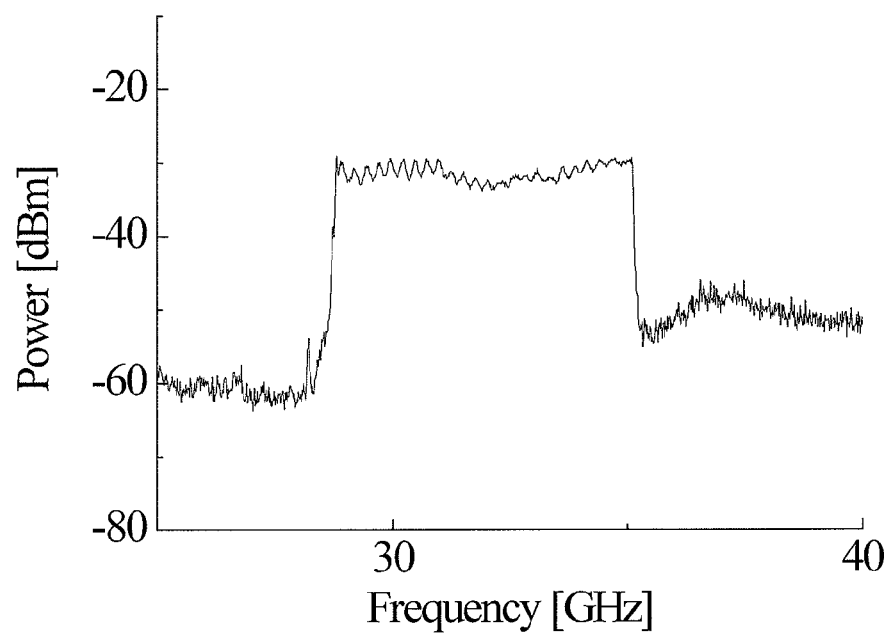
FIG. 27 is the enlarged figure of a part of FIG. 26.
Figure 28:
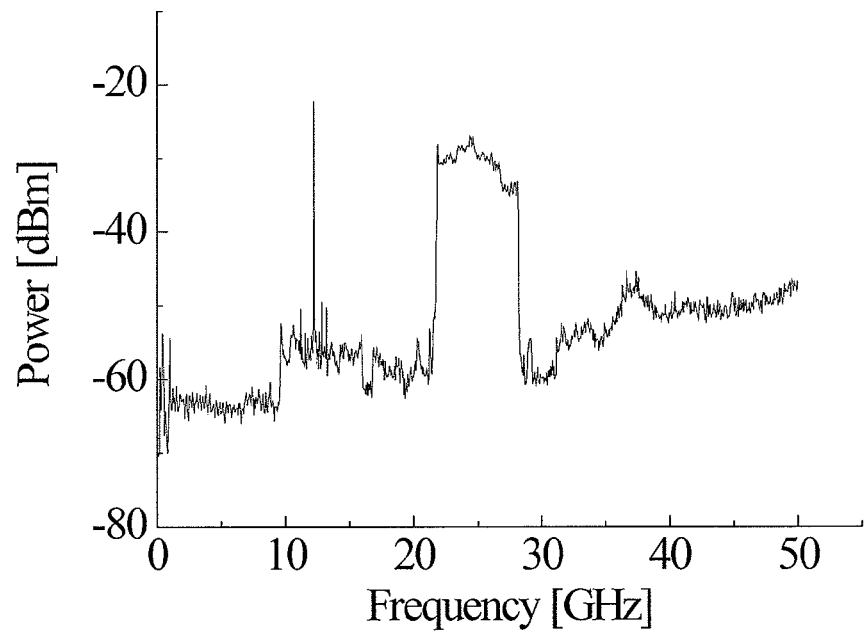
FIG. 28 is the graph replaced with figure which shows a radio-frequency spectrum when the wavelength of the light source 2 is 1549.875 nm.
Figure 29:
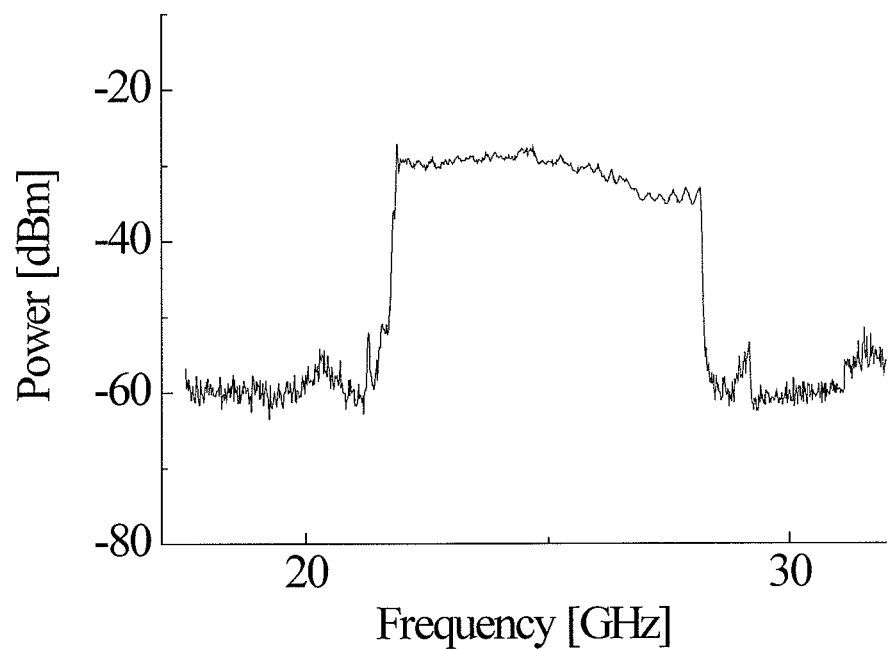
FIG. 29 is the enlarged figure of a part of FIG. 28.

FIG. 26 is the graph replaced with figure which shows a radio-frequency spectrum when the wavelength of the light source 2 is 1549.93 nm. The input optical-frequency difference was 18.7 GHz. An occurrence frequency example is from 34.7 GHz (18.7 GHz+16.0 GHz). It was 28.3 GHz (18.7 GHz+9.6 GHz). As shown in FIG. 26, 18.7 GHz has a beat with an SSB modulator remains carrier wave. An overlapping of the intensity variation (beat of a remains carrier wave and USB) in which remains LSB of an SSB modulator output, the beat of the light source 2, and an SSB modulator output have a constituent of a 10-20 GHz belt exists. FIG. 27 is the enlarged figure of a part of FIG. 26. FIG. 28 is the graph replaced with figure which shows a radio-frequency spectrum when the wavelength of the light source 2 is 1549.875 nm. The input optical-frequency difference was 11.8 GHz. An occurrence frequency example is from 27.8 GHz (11.8 GHz+16.0 GHz). It was 20.6 GHz (11.8 GHz+9.6 GHz). As shown in FIG. 26, 11.8 GHz has a beat with an SSB modulator remains carrier wave. An overlapping of the intensity variation (beat of a remains carrier wave and USB) which an SSB modulator output has exists in a 10-20 GHz belt. FIG. 29 is the enlarged figure of a part of FIG. 28.

Working Example 4

Figure 30:
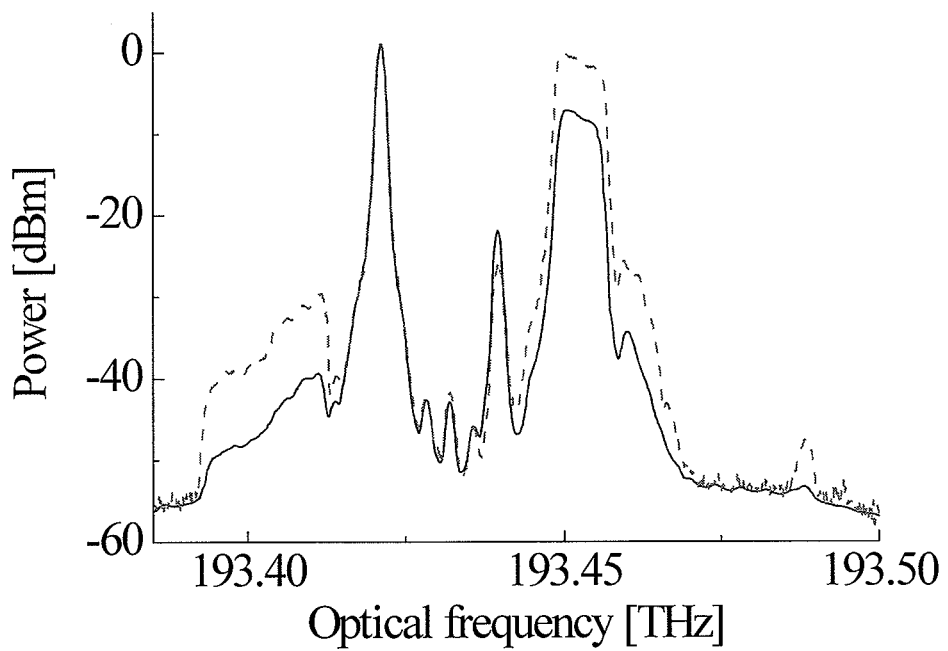
FIG. 30 is the graph replaced with figure which shows an amplifier output spectrum.
Figure 31:
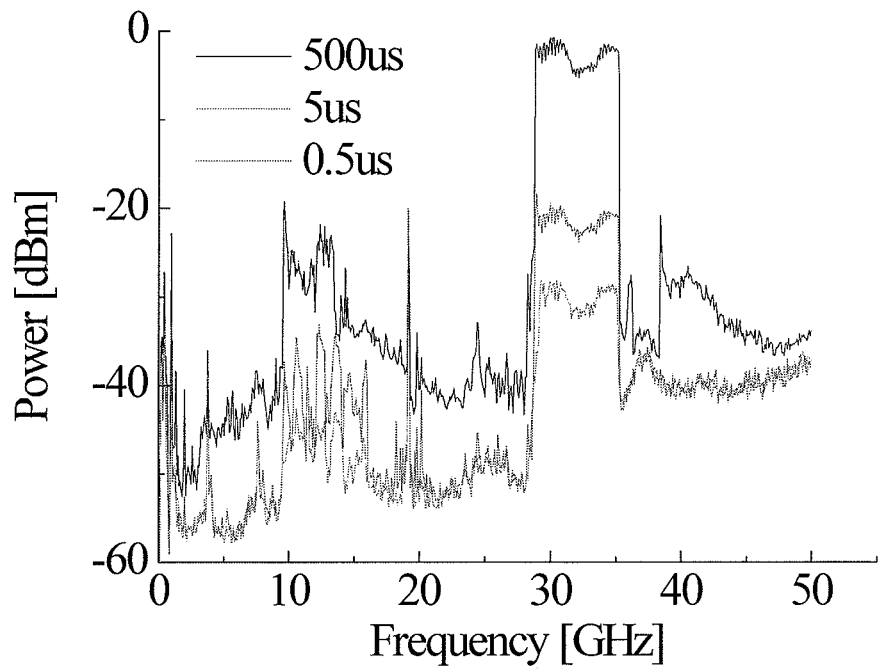
FIG. 31 is the graph replaced with figure which shows a radio-frequency spectrum.
Figure 32:
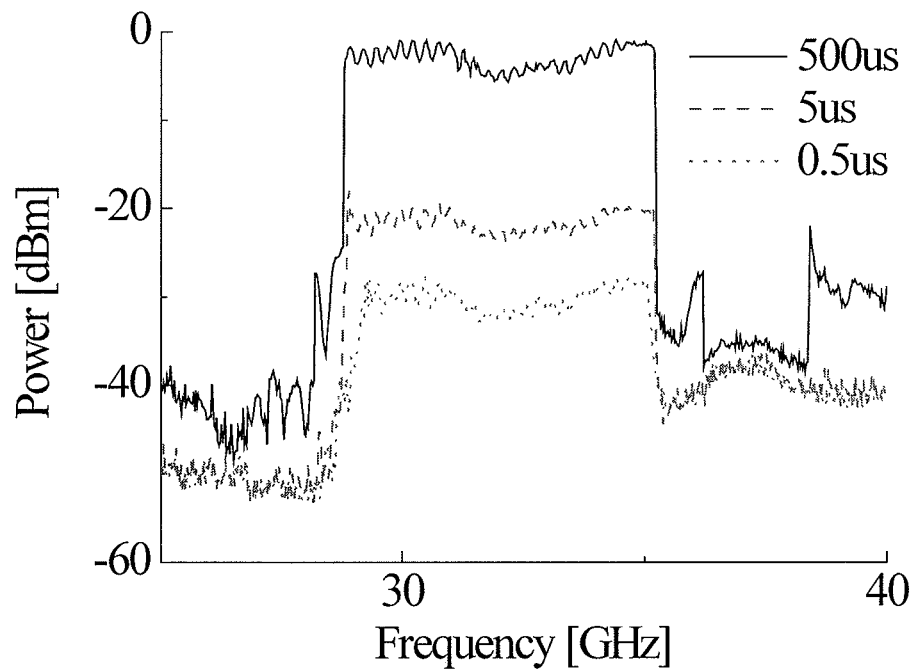
FIG. 32 is the enlarged figure of a part of FIG. 31.

The power of an optical-frequency-sweep signal and the light source 2 was balanced using light amplifier. After uniting the output of the light source 2, and the output of an SSB modulator by interleaver, the light was inputted protect device protective device through light amplifier (FITEL ErFA 11031-SFS: Pump LD current 75 mA) and a 1 nm bandpass filter. The wavelength of the light source 2 was set to be 1549.93 nm, and the power was set to be 0.3 mW with the set point. The frequency sweep speed was set to be 500 microseconds, 5 microseconds, or 0.5 micro second. FIG. 30 is the graph replaced with figure which shows an amplifier output spectrum. A solid line shows 500 microseconds of sweep rates, and a dotted line shows the thing of 5 microseconds of sweep rates. 0.5 micro second of sweep rates were almost the same as the thing of 5 microseconds of sweep rates. FIG. 31 is the graph replaced with figure which shows a radio-frequency spectrum. A top to frequency sweep speed of a graph is a thing for 500 microseconds, 5 microseconds, and 0.5 micro second. FIG. 32 is the enlarged figure of a part of FIG. 31.

The invention claimed is:

1. An optical frequency control device, comprising:
   an optical SSB (single side band) modulator;
   a source of bias voltage which applies bias voltage to the optical SSB modulator;
   an optical light source which supplies input light to the optical SSB modulator; and
   a source of a modulation signal which applies modulation signals to the optical SSB modulator,
   wherein the source of a modulation signal comprises:
      an arbitrary waveform generator for generating an electrical signal which has arbitrary waveforms and carrying out frequency sweep, the sweeping time of the arbitrary waveform generator being from 0.5 microseconds to 1 millisecond; and
      an electrical-signal frequency multiplier for multiplying the frequency of the electrical signal generated by the arbitrary waveform generator,
   whereby the modulation signal to the optical SSB modulator is generated by using the electrical signal generated by the arbitrary waveform generator and multiplied by the electrical signal frequency multiplier.

2. An optical frequency controlled signal generator which comprises the optical frequency control device of claim 1.

3. A precision measuring apparatus of optical filter comprising:
   the optical frequency control device of claim 1; and
   an optical detector, which measures the reflected light from an object to be measured or the light which penetrated the object, the reflected light and the penetrated light was outputted by the optical frequency control device.

4. A measuring apparatus, comprising:
   the optical frequency control device of claim 1;
   an optical detector which measures the reflected light from an object to be measured or the light which penetrated the object, the reflected light and the penetrated light was outputted by the optical frequency control device; and
   a control device which memorizes value which the optical detector detects and calculates a transitivity or a reflectivity using the memorized value.

5. The apparatus of claim 1, wherein the optical light source for the optical SSB modulator is an optical comb generator.

6. The apparatus of claim 1, wherein
   the optical light source for the optical SSB modulator is an optical light source and the wavelength of the light is adjustable.

7. A radio signal generator, comprising:
   the optical frequency control device of claim 1; and
   an optical detector which measures the light which is outputted from the optical frequency control device.

8. An optical frequency control device, comprising:
   the optical frequency control device of claim 1; and
   an optical comb generator,
   wherein the output signal of the optical frequency control device is inputted into the optical comb generator.

9. A radio signal generator, comprising:
   the optical frequency control device of claim 1;
   a light source which can generate light having an optical frequency which is different from that generated by the optical light source; and
   an optical light detector,
   wherein the optical light detector detects the light which was a mixture of output of the optical frequency control device and the light outputted by the optical light source.

10. The optical frequency control device of claim 1, wherein the frequency of waveform generated by the arbitrary waveform generator is 300 MHz to 500 MHz and the electrical signal has frequency of 1 GHz to 100 GHz.

11. The optical frequency control device of claim 1, wherein the frequency of the electrical signal is 9.6 GHz to 16 GHz.

12. The optical frequency control device in accordance with claim 1, wherein the electrical signal generated by the arbitrary waveform generator (5) is a chirp signal, frequency of the chirp signal being from 300MHz to 500MHz.

13. The optical frequency control device in accordance with claim 1, wherein the arbitrary waveform generator (5) carries out a frequency sweep from 300 MHz to 500 MHz.

14. A method for controlling frequency of optical light, using an optical frequency control device comprising:
   an optical SSB modulator;
   a source of bias voltage which applies bias voltage to the optical SSB modulator;
   an optical light source which supplies input light to the optical SSB modulator; and a source of a modulation signal which applies modulation signals to the optical SSB modulator, wherein, the source of a modulation signal comprises:

an arbitrary waveform generator for generating the electrical signal which has arbitrary waveforms and carrying out frequency sweep, the sweeping time of the arbitrary waveform generator being from 0.5 microseconds to 1 millisecond; and an electrical signal frequency multiplier for multiplying the frequency of the electrical signal generated by the arbitrary waveform generator, comprising the steps of:

generating modulation signal to the optical SSB modulator using the electrical signal being generated by the arbitrary waveform generator and being multiplied by an electrical signal frequency multiplier, and applying the modulation signal to the optical SSB modulator.

15. An optical frequency control device, comprising:
a modulator;
a source of bias voltage which applies bias voltage to the modulator;
an optical light source which supplies input light to the modulator; and
a source of a modulation signal which applies modulation signals to the modulator,
wherein the source of a modulation signal comprises:

an arbitrary waveform generator for generating the electrical signal which has arbitrary waveforms and carrying out frequency sweep, the sweeping time of the arbitrary waveform generator being from 0.5 microseconds to 1 millisecond; and an electrical-signal frequency multiplier for multiplying the frequency of the electrical signal generated by the arbitrary waveform generator, whereby the modulation signal to the modulator is generated by using the electrical signal generated by the arbitrary waveform generator and multiplied by the electrical signal frequency multiplier.

16. The optical frequency control device of claim 15, wherein the modulator is an optical DSB-SC modulator.

17. The optical frequency control device of claim 15, wherein the modulator is an optical intensity modulator or optical phase modulator.

18. The optical frequency control device of claim 15, wherein the modulator is an optical intensity modulator or optical phase modulator and optical filter.

19. An optical frequency control device, comprising:
the optical frequency control device of claim 16; and
an optical comb generator,
wherein the output signal of the optical frequency control device is inputted into the optical comb generator.

20. An optical frequency control device, comprising:
the optical frequency control device of claim 17; and
an optical comb generator,
wherein the output signal of the optical frequency control device is inputted into the optical comb generator.

21. A optical frequency control device, comprising:
the optical frequency control device of claim 18; and
an optical comb generator,
wherein the output signal of the optical frequency control device is inputted into the optical comb generator.

22. A radio signal generator, comprising:
the optical frequency control device of claim 16; and
an optical light detector,
wherein the output signal of the optical frequency control device is detected by the optical light detector.

23. A radio signal generator, comprising:
the optical frequency control device of claim 15; and
an optical light detector,
wherein the output signal of the optical frequency control device is detected by the optical light detector.

24. A radio signal generator, comprising:
the optical frequency control device of claim 16;
a light source which can generate light having an optical frequency which is different from that generated by the optical light source; and
an optical light detector,
wherein the optical light detector detects the light which was a mixture of output of the optical frequency control device and the light outputted by the optical light source.

25. A radio signal generator, comprising:
the optical frequency control device of claim 17;
a light source which can generate light having an optical frequency which is different from that generated by the optical light source; and
an optical light detector,
wherein the optical light detector detects the light which was a mixture of output of the optical frequency control device and the light outputted by the optical light source.

26. A radio signal generator, comprising:
the optical frequency control device of claim 18;
a light source which can generate light having an optical frequency which is different from that generated by the optical light source; and
an optical light detector,
wherein the optical light detector detects the light which was a mixture of output of the optical frequency control device and the light outputted by the optical light source.

* * * * *